(12) United States Patent
Ellis

(10) Patent No.: US 7,444,961 B1
(45) Date of Patent: Nov. 4, 2008

(54) ANIMAL SORTING AND GRADING SYSTEM USING AN INTERNAL EVALUATION TO PREDICT MAXIMUM VALUE

(76) Inventor: James S. Ellis, 1790 Elmwood St., Broomfield, CO (US) 80020

( * ) Notice: Subject to any disclaimer, the term of this patent is extended or adjusted under 35 U.S.C. 154(b) by 364 days.

(21) Appl. No.: 11/412,815

(22) Filed: Apr. 27, 2006

Related U.S. Application Data

(63) Continuation-in-part of application No. 11/103,191, filed on Apr. 11, 2005, now abandoned.

(51) Int. Cl.
*A01K 1/10* (2006.01)
(52) U.S. Cl. .................. 119/842; 119/840; 382/110
(58) Field of Classification Search ......... 119/842, 119/14.18, 840, 841, 14.08; 382/110; 600/437, 600/443, 444, 445, 446, 447; 452/157, 184
See application file for complete search history.

(56) References Cited

U.S. PATENT DOCUMENTS

| | | | | |
|---|---|---|---|---|
| 4,228,685 A | * | 10/1980 | Wallace et al. ............. | 73/865 |
| 4,617,876 A | | 10/1986 | Hayes | |
| 4,745,472 A | | 5/1988 | Hayes | |
| 4,785,817 A | * | 11/1988 | Stouffer ................ | 600/443 |
| 5,140,988 A | * | 8/1992 | Stouffer et al. ............ | 600/437 |
| 5,303,708 A | * | 4/1994 | Stouffer ................ | 600/437 |
| 5,339,815 A | * | 8/1994 | Liu et al. ............... | 600/437 |
| 5,398,290 A | * | 3/1995 | Brethour ............... | 382/128 |
| 5,483,441 A | | 1/1996 | Scofield | |
| 5,573,002 A | | 11/1996 | Pratt | |
| 5,576,949 A | | 11/1996 | Scofield et al. | |
| 5,644,643 A | | 7/1997 | Scofield | |
| 5,668,634 A | * | 9/1997 | Newman ............... | 356/445 |
| 5,673,647 A | | 10/1997 | Pratt | |
| 5,685,307 A | | 11/1997 | Holland | |
| 5,836,880 A | | 11/1998 | Pratt | |
| 5,944,598 A | * | 8/1999 | Tong et al. .............. | 452/158 |
| 5,960,105 A | * | 9/1999 | Brethour ............... | 382/141 |
| 6,000,361 A | | 12/1999 | Pratt | |
| 6,084,407 A | | 7/2000 | Ellis | |
| 6,099,473 A | * | 8/2000 | Liu et al. ............... | 600/449 |
| 6,135,055 A | | 10/2000 | Pratt | |
| 6,198,834 B1 | * | 3/2001 | Belk et al. .............. | 382/110 |
| 6,200,210 B1 | | 3/2001 | Pratt | |
| 6,318,289 B1 | | 11/2001 | Pratt | |
| 6,516,746 B2 | | 2/2003 | Pratt | |
| 6,549,289 B1 | * | 4/2003 | Ellis .................... | 356/603 |
| 6,563,580 B1 | * | 5/2003 | Aignel et al. ............ | 356/300 |
| 6,563,904 B2 | * | 5/2003 | Wijts et al. ............. | 378/58 |

(Continued)

*Primary Examiner*—Yvonne R. Abbott
(74) *Attorney, Agent, or Firm*—James R. Young

(57) ABSTRACT

A system that compares, ranks, sorts and grades animals into groups of like kinds according to previously determined predicted maximum values. The system uses a single method such as multi-dimensional single voxel(s) of MR, NMR, MRI, ultrasound, C.A.T. scan, CT scan, P.E.T. scan, or a combination of these, or any equivalent internal measuring device, on a single occasion, to evaluate the animal and determine a number of days the animal must be fed to reach a maximum value. The system also combines internal evaluation with an external animal evaluation system to refine the number of days remaining for the animal to reach a maximum value, and the system, when used in a feedlot, will direct the animal to a feed pen based on the number of days remaining for the animal to reach maximum value.

17 Claims, 11 Drawing Sheets

U.S. PATENT DOCUMENTS

| | | | |
|---|---|---|---|
| 6,587,575 B1 * | 7/2003 | Windham et al. | 382/110 |
| 6,615,661 B2 * | 9/2003 | King | 73/602 |
| 6,676,604 B2 * | 1/2004 | Talia et al. | 600/449 |
| 6,735,326 B1 * | 5/2004 | Schimitzek | 382/110 |
| 6,751,364 B2 * | 6/2004 | Haagensen et al. | 382/313 |
| 6,796,184 B2 * | 9/2004 | King | 73/602 |
| 6,805,075 B2 * | 10/2004 | Pratt | 119/51.02 |
| 6,891,961 B2 * | 5/2005 | Eger et al. | 382/110 |
| 2002/0037092 A1 * | 3/2002 | Craig et al. | 382/110 |

* cited by examiner

ANIMAL SORTING AND GRADING SYSTEM USING AN INTERNAL EVALUATION TO PREDICT MAXIMUM VALUE

This application is a Continuation in-part of application Ser. No. 11/103,191, filed Apr. 11, 2005 now abandoned.

FIELD OF THE INVENTION

This invention relates to a process for comparing, ranking, grading and sorting animals into groups of like kinds by using internal evaluations on a single occasion and predicting a timeframe in which an animal reaches a desired maximum value and more particularly to use a method such as multi-dimensional single voxels of MR, NMR, MRI, ultrasound, C.A.T. scan, CT Scan, P.E.T. scan, or a combination of these for those evaluations that result in predicting the time frame for the desired maximum value. Even more particularly, this invention relates to the use of a non-invasive internal evaluation on a single occasion, preferably in concert with any external animal measuring system to evaluate an animal to predict the timeframe to achieve a desired maximum value and compare, rank, grade or sort the animal accordingly.

BACKGROUND OF THE INVENTION

One of the greatest challenges facing the meat producing industry today is to provide consistent uniform quality and conformity for their end products. In beef cattle feeding the inconsistencies are the number of days an animal is fed (days on feed) to reach its maximum potential carcass value at which time the animal is referred to as finished. During the cattle feeding period the average number of days on feed for an entire pen of 300 animals is approximately 120 days. The entire pen is then marketed to a beef processor.

At the processing plant, the USDA (U.S. Dept. of Agriculture) meat inspectors (graders) determine the quality of the meat. The carcass is severed between the $12^{th}$ and $13^{th}$ rib allowing the USDA grader to view a cross-sectional area of the internal longissimus dorsi muscle that is commonly referred to as the ribeye because it eventually becomes a cut known as the ribeye steak. By using a template device and subjective visual appraisal, the USDA grader evaluates both the surface area of the ribeye and the flecks of intramuscular fat (I. Fat) within the ribeye. Flecks of I. Fat (also called marbling) or the percentage of I. Fat that is found in the ribeye area is used to grade the entire carcass.

The percentage of I. Fat can vary dramatically from one carcass to another. The range of I. Fat can be as low as 1% in one carcass and as high as 12% in another carcass that would receive the highest grading as USDA Prime. More marbling within the muscle has a very positive correlation to the tenderness, juiciness, palatability and cooked flavor of the meat. The USDA grader rates each carcass as USDA Prime, USDA Choice, USDA Select, etc. With a very few exceptions, feedlot operators receive the highest price for USDA Prime carcasses and receive a lesser price with each respective grading. In turn, processing plants with very few exceptions, receive the highest price in the retail market for USDA Prime meat cuts with each respective grading a lesser price.

In the beef cattle feeding process, inconsistencies arise because a few animals are finished after being fed only 85 days, others 95 days and still others 105 days. Larger portions of the animals are finished between 105 days and the 120-day average. These animals are over-fed and continue to gain additional unwanted body fat until the entire pen of cattle is marketed on the $120^{th}$ day. Within a pen of animals, an average of 5% or 15 head are over-fed resulting in being too fat and receive reduced prices called yield grade discounts or "Heavy" for their carcasses at the processing plant. The yield grade discount average can reduce the value of the carcass by 15-20%. An additional 10% or 30 head can be over-fed resulting in reduced carcass prices in the range of 3-5% per animal.

It might seem that a logical approach to reduce yield grade discounts would be to sort out the 30 animals on day 110 for example and deliver them to market. This solution creates two additional problems. First of all, a human visual sorting will only be partially accurate when compared to the results at the processing plant, therefore, one may not find the correct 30 animals. Secondly, the disturbance of sorting 30 animals out of the pen and the disturbance as the remaining animals re-align the pecking order within the pen can cause several days of no weight gain for the remaining 270 animals. This likely will cost the cattle feeder more than the yield grade discounts.

Another inconsistency is the portion of animals within the pen that need more than 120 days on feed to reach their maximum potential carcass value. There are an average of 115 under-fed animals that are marketed with the entire pen. At the processing plant their carcasses are lighter in weight, not finished and they receive carcass discounts when they are designated by the plants as "lites". An average of 2% or 6 animals within the entire pen of 300 animals are lites and receive carcass discounts that reduce the value of each carcass as much as 15-20%.

There is also a hidden added value within this group of 115 under-fed animals. An average of 70% or 80 animals of the 115 under-fed group could be fed an additional 5-20 days allowing them to reach their maximum potential carcass value. Instead of receiving a reduced carcass value, these animals would actually receive an additional increase in carcass value of 5-10% per head as they reach their maximum carcass value.

A final inconsistency is caused by a lack of genetics that prevent a portion of the animals from reaching even the minimum carcass values. An average of 6-12% of the animals within the entire pen of 300 animals are genetically unable to attain carcass values that would provide a profit for cattle feeders. Additional days on feed will only result in additional unwanted backfat. This would not improve the quality of the meat within the carcass nor the potential carcass value. These genetic related carcass losses can range from 5% to nearly 30% per animal.

The over-fed yield grade discount losses plus the under-fed carcass discount losses plus the hidden added value plus the genetic losses combine for a total uncaptured added value potential of over 4-5% for the entire pen of 300 head of cattle. With over 25 million beef cattle fed annually, these uncaptured values are costing the industry well over $1 billion.

Historically, in the last half century, the use of individual animal identification combined with the animal's weight on the day they entered the feedlot was one of the factors used to sort the cattle into pens. As feedlots grew larger the cattle feeders soon found that an added step of having a visual human appraisal (the keen eye of a good "cattle feeder") was helpful in sorting the cattle by size; tall and long, middle sized, or short and compact. Not unlike grouping the $1^{st}$ graders, $2^{nd}$ graders and $3^{rd}$ graders, this procedure allowed similar sized animals to increase their daily rate of gain adding value to the bottom line.

There is another segment of the beef industry called the cow-calf operations. These operations with beef cow herds annually produce a crop of calves. The female calves are usually retained for herd replacements, however, some can go on to the feedlots and eventually to the processing plants. The majority of the male calves are raised and sold to feedlots to be fattened and then on to the processing plants. Cow-calf operators also face the challenge to provide consistent uniform quality and conformity for their calf crops that eventually become the selected meat cuts on the store shelf.

Annually, cow-calf operators struggle with critical decisions that directly effect their profits at the point of sale of their male calf crop. Other decisions effect their future herd profits when selecting female herd replacement from their female calf crop. Perhaps one of the most critical decisions that cow-calf operations make is that of bull selections. The bull selection decisions will have the greatest single impact on the future production of their cow-calf herd by introducing improved genetics into their herd. Historically, several factors have been used to make these decisions, including the keen eye of a good "cow-calf operator", the individual identification of the bulls, cows and calves combined with live weight measurements.

Similar inconsistencies can be found within segments of the swine and poultry industries. Although the degrees of inconsistency and the value placed thereon may vary, the need for consistent uniform quality and conformity remains.

More recently, systems have evolved using two-dimensional video techniques to measure external animal conformation that measure a few linear conformation traits. Other systems have evolved using ultrasound technologies to measure internal traits of an animal such as the size of a ribeye muscle, the percentage of I. Fat and the thickness of the backfat on an animal. When measuring intramuscular fat, ultrasound images record numerous lighter gray slashes (within the muscle area image) referred to as "speckle". Speckle is the result of sound waves splashing in all directions when encountering a fat cell or fat globule. The percentage of I. Fat can be calculated wherein smaller, moderate or abundant amounts of speckle correlate to various ranges of I. Fat percentages.

Additionally, other systems combine several of the above systems for beef animals during a feedlot period using feedlot entry day images which are compared with subsequent images in combination with several age-old measuring techniques such as animal weight to calculate an optimum slaughter date. Thereafter, animals are again sorted into groups with similar slaughter dates. However, subsequent imaging in a chute and resorting the animals into different feeding pens can be costly to feedlot operators.

Thus, there is a need within the feedlot segment of the livestock industry to use internal and external evaluations to predict a timeframe in which the animal reaches a desired maximum value and to sort those animals into groups of like kinds as they enter the feeding process. There is also a need within the production segment (i.e. cow-calf) of the livestock industry to use internal and external evaluations to compare offspring to parentage for genetic improvement evaluations, to compare and sort offspring with like kinds for market and future sales, to compare female offspring with like kinds to sort and determine herd replacements, and to compare potential sires with like kinds for future use in the herd with all of the above evaluations designed to achieve a desired maximum value.

One method for combining individual animal identification and sorting cattle is described in U.S. Pat. No. 4,617,876 issued Oct. 21, 1986 to Hayes, entitled, "Animal Identification and Control System". This method describes identifying cattle (previously given identification or I.D.) at a water source and sorting cattle for various reasons into an "exit way pen" or an "exit way path" and then sorting them further into "holding pens". The exit way pen or exit way path may be an unnecessary step in the sorting process. Additionally, the exit way pen, the exit way path or the holding pens provide no feed, no water and added stress for the sorted animal. Other methods for evaluating animals are shown in U.S. Pat. No. 4,745,472 issued May 17, 1988 to Hayes, entitled, "Animal Measuring System". This method uses a video camera to take a picture of the animal with plastic patches placed on several points of the animal. The pictured is processed by a computer system to determine a few linear measurements between these points. Another method of evaluating an animal is shown in U.S. Pat. No. 5,483,441 issued Jan. 9, 1996 to Scofield, and U.S. Pat. No. 5,576,949 issued Nov. 19, 1996 to Scofield and Engelstad, with both patents entitled, "System for Evaluation Through Image Acquisition" along with U.S. Pat. No. 5,644,643 issued Jul. 1, 1997 to Scofield and Engelstad, entitled, "Chute For Use With An Animal Evaluation System". The above systems use a video camera for an external evaluation in two-dimensions. None of the above systems include any reference for internal evaluations of an animal.

An additional method for compiling animal conformation and sorting cattle into groups of like kinds by calculated slaughter dates is shown in the following U.S. Pat. No. 5,673,647 issued Oct. 7, 1997, U.S. Pat. No. 6,000,361 issued Dec. 14, 1999, U.S. Pat. No. 6,135,055 issued in Oct. 24, 2000, U.S. Pat. No. 6,318,289 issued Nov. 20, 2001 and U.S. Pat. No. 6,516,746 issued Feb. 11, 2003 all issued to Pratt and all entitled, "Cattle Management Method and System". The methods described in all of these patents use an initial two-dimensional external measuring and an ultrasound internal measuring of the animals as they enter the feedlot. It is important to note that the methods described require a remeasuring or subsequent external and internal measuring of the animals at a later point in time in the feedlot. The change (additional growth, shape, weight, etc.) in the animal from the initial measurements to the subsequent measurements are used to determine the slaughter date for the animal. Animals are then again resorted into groups according to future slaughter dates. Both moving animal(s) through a chute for remeasuring (or subsequent measuring) and resorting cattle can prove to be detrimental to animals and costly for the feeding process. There are stress factors to consider each time the animals are run through a chute and resorting cattle into different feeding pens will result in additional stress as the animals re-align the pecking order within the pens. Either can cause loss of weight or reduced daily gain (growth and weight) which are costly to feedlot operations.

Still other methods using ultrasound for internal measuring of animals and carcasses are described in the following U.S. Pat. No. 4,785,817 issued Nov. 22, 1988 entitled, "Method and Apparatus for Ultrasonic Grading of Meat" issued to Stouffer, and U.S. Pat. No. 5,140,988 issued Aug. 25, 1992 entitled, "Detention of Abnormal Bone Structure in Animals and Caracsses with Ultrasound" issued to Stouffer, U.S. Pat. No. 5,398,290 issued Mar. 14, 1995 entitled, "System for Measurement of Intramuscular Fat in Cattle" issued to Brethour, and U.S. Pat. No. 5,685,307 issued Nov. 11, 1997 entitled, "Method and Apparatus for Tissue Characterization of Animals Using Ultrasound" issued to Holland. Other methods using ultrasound for internal measuring of animals and carcasses are described in the following U.S. Pat. No. 5,573,002 issued Nov. 12, 1996 entitled, "Method and Apparatus for Measuring Internal Tissue Characteristics in Feed Animals", and U.S. Pat. No. 5,836,880 issued Nov. 17, 1998 entitled, "Automated System for Measuring Internal Tissue Characteristics in Feed Animals", and U.S. Pat. No. 6,200,210 issued Mar. 13, 2001 entitled, "Ruminant Tissue Analysis at Packing Plants for Electronic Cattle Management and Grading Meat" with all issued to Pratt. Again, these methods also describe the use of ultrasound for the internal measuring of animals/carcasses and make neither reference to nor provide any description of any means to evaluate an animal on a single occasion to predict the timeframe to achieve a desired maximum value and compare, rank, grade or sort them accordingly.

It is thus apparent that there is a need in the art for an improved process for comparing, sorting and grading animals in to groups of like kinds by evaluating and predicting a timeframe in which an animal reaches a desired maximum value. There is a further need in the art for such a process to reduce the number of internal evaluations for each animal. And still a further need in the art is for such a process to reduce the number of external measurements of an animal. A further need is for such a process that does not require that patches be affixed to the animal before measuring. An additional need in the art is for such a process that can sort animals without unnecessary exit way pens, exit way paths or holding pens all of which may not provide feed and water for the animals. There is a further need in the art for such a process with at least one non-invasive internal evaluation that may preferably be combined with an external evaluation conducted on a single occasion that could predict a timeframe for the animal to reach a desired maximum value and compare or sort that animal into groups of like kinds without remeasuring or subsequent imaging the animal at a later time in the feedlot. The present invention meets these and other needs in the art.

SUMMARY OF THE INVENTION

It is an aspect of the invention to compare, rank, sort and grade animals with a computer system into groups of like kinds according to previously determined desired maximum values.

Another aspect of this invention is to provide a non-invasive internal evaluation (IE) of the animal using a single method such as multi-dimensional single voxels of Magnetic Resonance (commonly referred to as NMR or often used interchangeably with MR or MRI), Nuclear Magnetic Resonance (NMR), Magnetic Resonance Imaging (MRI), ultrasound evaluation, C.A.T. scan (often referred to as CT scans), P.E.T. scan, or a combination of these methods, or any equivalent internal measuring device, on a single occasion.

Still another aspect is to predict a timeframe with a computer system in which an animal can reach a desired maximum value.

Yet another aspect is to provide an external evaluation (EXE) when applicable of the animal on a single occasion in concert with the internal evaluation.

And still another aspect is to use the IE/EXE evaluations and a computer system that will compare the animal to groups of like kind and thereby predict a timeframe in which an animal will reach a desired maximum value and the computer systems will sort and direct the animal into groups of like kind.

Within the feedlot segment of the beef industry, cattle are compared, ranked, and sorted using IE/EXE evaluations on a single occasion. The internal evaluations usually include an internal measuring of the longissimus dorsi muscle, referred to as the ribeye, between the $12^{th}$ and $13^{th}$ rib area of an animal but can also be accomplished at numerous other muscle locations. The internal evaluation is completed in a few seconds to measure the size of the ribeye and percent of intramuscular fat (I. Fat) within the ribeye muscle. Backfat along with hide thickness can also be measured if necessary. When applicable, the EXE evaluation is completed in seconds and can be merged with the IE. The EXE includes any number of two-dimensional or three-dimensional animal measuring systems that measure linear, and if necessary volumetric and angular conformation traits of an animal. A computer system used for the IE/EXE evaluations can be unique to the IE/EXE evaluations or can be combined with most computer systems within the industry.

The IE portion of the IE/EXE evaluation is used to determine the percent I. Fat of an animal, which in turn is in used to provide the basic timeframe (number of days) needed to reached maximum carcass value. Numerous other factors add to or subtract from the number of days that the animal needs to remain on full feed in the feedlot to reach maximum carcass value. These factors with numerous variations include but are not limited to the external evaluation of the animal's conformation, sex, feedlot entry weight, ration, regional climate and, if known, the breed type and age. Beginning with the feedlot entry date, the timeframe or number of days on feed is adjusted for the various factors and a predicted days to maximum value (PDMV) is calculated for the animal.

As animals enter the feedlot they are evaluated with the IE and preferably EXE and given a PDMV. The PDMV is then recorded by a unique tag for the animal or with the animal's feedlot identification means used throughout the feedlot computer system. The computer system then sorts the animal by PDMV and directs the animal to a pen with animals that have identical PDMVs or similar PDMV ranges. The result is that all of the animals in a particular feedlot feeding pen go to market on or about the same PDMV day which dramatically reduces the dollars lost with the over-fed/under-fed dilemma.

The present invention also has advantages in the cow-calf segment and the carcass segment of the beef industry. Using these techniques the cow-calf operators can evaluate their calf crop using IE/EXE along with computer means to rank, compare and sort the offspring for future sales, herd replacement and herd sire selection. Those skilled in the art will recognize that any animal's carcasses can be accurately measured using the IE/EXE evaluations along with computer systems to rank, compare and sort carcasses in a grading system that is like or similar to the current USDA grading system.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

Figure 1:
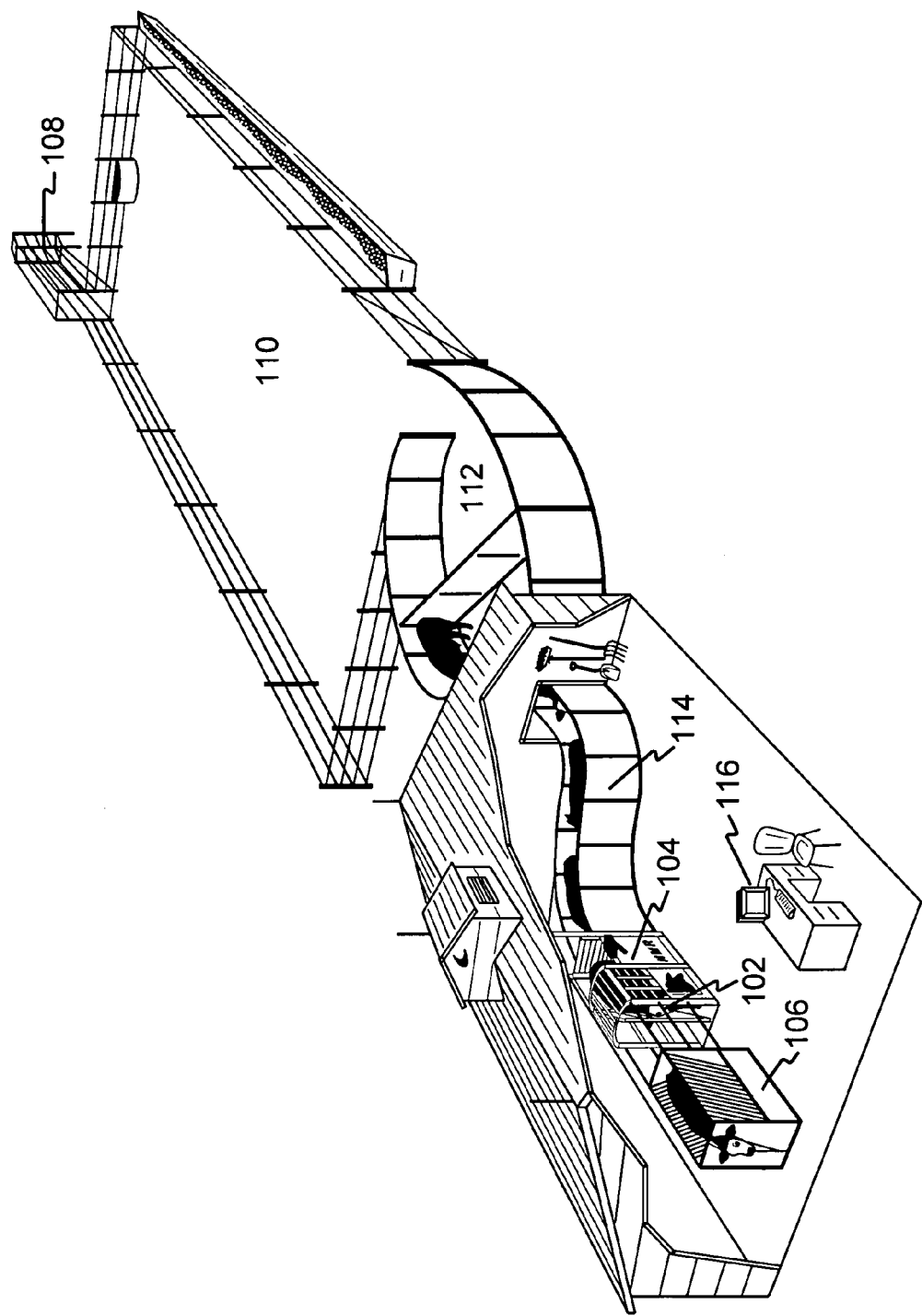
FIG. 1 shows a view of the present invention where the IE/EXE chute apparatus is placed within the area that is used to process the cattle when entering the feedlot.

The following description is of the best presently contemplated mode of carrying out the present invention. This description is not to be taken in a limiting sense but is made merely to describe the general principles of the invention. The scope of the invention should be determined by referencing the appended claims.

Cattle are sorted into groups in the feedlot segment of the beef industry with a computer system by predicting a timeframe in which each animal will reach a desired maximum value. The timeframe, commonly called "days on feed", is the number of days from the date that the animal enters the feedlot until the date that animal reaches a desired maximum value. The desired maximum value or Predicted Days to Maximum Value (PDMV) in the feedlot segment is when that animal is referred to as "finished". Finished is a term used that indicates that the animal has reached full potential carcass value. This means the animal has been feed the optimum number of days to maximize growth resulting in the maximum quantity of muscle (meat) and the maximum quality of the meat that can be measured by percent intramuscular fat (I. Fat %). If fed beyond the finished date, the result is that the animal gains unwanted fat surrounding the internal organs and unwanted subcutaneous fat, commonly referred to as backfat and may receive carcass discounts in addition to feed cost losses.

As part of the sorting process, each animal is examined and evaluated internally using a single method such as voxels of MR, NMR, MRI, ultrasound, C.A.T. scan, CT scan, Dual Energy X-ray, Differential Neutron Absorption, P.E.T. scan, or a combination of these methods, or any equivalent internal measuring device. The voxels from any of the internal measuring devices usually include, but are not limited to, various sized small volumes of individualized bits of data attained in a very rapid manner. Internal voxel data can be used for evaluating on an individual voxel basis, as a series of voxels, as an averaged series of voxels, as best in a series of voxels, in any combination of voxel(s) of various measuring devices or in any combination of voxel(s) in concert with the traditional imaging of any of the devices. This internal evaluation (IE) is usually taken but not limited to the area between the $12^{th}$ and $13^{th}$ rib of the animal. The internal evaluation usually includes, but is not limited to, measuring the surface area of a cross-section of the ribeye muscle (Size of Ribeye), percent of I. Fat within the ribeye cross-section and the thickness of the backfat in that area. If desired, the thickness of hide in that area is also measured to evaluate a desired maximum value for the hide that will be marketed to the processing plant in the future. I. Fat % is of the single greatest importance in the internal evaluation process and can be used solely for the IE. Past research has shown that if animal A has 10% more I. Fat at the $12^{th}$ and $13^{th}$ ribeye location than animal B, then animal A will have 10% more I. Fat within each muscle in the body. Therefor, given that all animals are measured in an equitable manner, it is possible to evaluate the I. Fat % (and backfat if needed) independently at another muscle location such as, but not limited to, the round muscle (rear hindquarter of the beef animal). However, additional information such as Size of Ribeye and backfat thickness (also hide thickness) add additional value to the over-all IE.

There are several possible means to complete the internal evaluation. Multi-dimensional single voxel of Magnetic Resonance or a series of MR voxels, sometimes called MRI, Nuclear Magnetic Resonance, Magnetic Resonance Imaging, ultrasound, C.A.T. scans or P.E.T. scans is used at the $12^{th}$ and $13^{th}$ rib location to evaluate I. Fat %, Size of Ribeye and if desired the thickness of backfat and hide. It is also possible to use various combinations of internal measuring devices to enhance over-all IE accuracy while reducing the time required for each individual IE. One example of a: combination of internal measuring devices used for IE may include, but not limited to, at least one MR voxel evaluation or preferably an averaged series of MR voxel evaluations used to determine the I. Fat % at any muscle location. The MR voxel (s) evaluation is then combined in concert with C.A.T. scan voxel(s) used to evaluate Size of Ribeye and if desired the thickness of backfat and hide at the $12^{th}$ and $13^{th}$ rib location.

The external evaluation (EXE) of the animal is completed using any animal measuring system but preferably a three-dimensional system designed for measuring animals such as laser technology, structured light technology or light pattern triangulation. External evaluations can range from a simple 2D single trait animal measuring system to a three-dimensional animal evaluation system in which the computer system creates a three-dimensional surface modeling of an animal that can thereafter measure a single linear conformation trait such as stature at the hip. The EXE evaluation can also include but is not limited to numerous other linear, volumetric, and angular conformation trait measurements such as the volume of the round (rump muscle), volume of the belly, angle of the hip, width of hip, width of shoulder, length of barrel, etc. See, for example, U.S. Pat. No. 5,412,420 issued to Ellis, May 2, 1995 entitled, "Three-Dimensional Phenotypic Measuring System for Animal", and U.S. Pat. No. 6,377,353 issued to Ellis, Apr. 23, 2002 entitled, "Three-Dimensional Measuring System for Animal Using Structured Light", and U.S. Pat. No. 6,549,289 issued to Ellis, Apr. 15, 2003 entitled, "Three-Dimensional Measuring System for Animal Using Light Pattern Triangulation", incorporated herein by reference for all that is disclosed and taught therein.

Cattle arrive at the feedlot from various locations in various numbers with the groups usually averaging 700 pounds per animal. Feedlots can receive a few hundred head per week or up to a thousand per day that eventually are sorted into feeding pens holding 200 to 400 head per pen. Normally, the first procedure at the feedlot is to individually process each animal in a traditional chute apparatus. This processing can vary but usually includes inserting various means of individualized identification (I.ID) which could be various forms of ear tags, electronic identification (EID) tags, implanted electronic systems, internally injected electronic systems or any others means of identification. The I.ID is then recorded in many cases, by input to a feedlot computer system, along with various information, facts and data collected for each animal on the entry day process. The information recorded on each individual animal may include but is not limited to the animal's weight, health status, vaccinations, animal health products if administered, health records, inserted implants, etc. all of which is usually recorded by animal I.ID in a feedlot computer data base. This information data for the I.ID animal can be maintained in a history file and additional informational data may be include as the animal progresses through the feeding process and into the processing plant. During this initial process, in the traditional chute apparatus or preferably in an additional chute apparatus placed prior to and in-line with the existing traditional chute, the internal evaluation (IE) can be completed on a single occasion. Preferably, but not absolutely necessary, the EXE evaluation can be completed in concert with the internal evaluation.

During this feedlot entry day processing, the internal portion of the evaluation which includes but is not limited to Size of Ribeye, I. Fat percentage and backfat thickness are used to determine the average days on feed needed for the animal to reach maximum carcass value. For example, previously compiled data would indicate that an animal with 8.2% I. Fat (potential USDA Choice) would commonly require an average of 123 days on feed to reach maximum carcass value. Another animal with 3.5% I. Fat (potential USDA Select) would require an average of 131 days on feed to reach maximum carcass value. The internal evaluation is used to determine at least the I. Fat % (along with the Size of Ribeye and backfat if desired) of each animal and the average number of days on feed (IE I. Fat % Days) needed to reach their maximum carcass value.

Other factors with numerous variations can add to or subtract from these average days on feed. These factors included but are not limited to the EXE evaluation for animal conformation, sex, feedlot entry day weight, breed type, and age. For example, taller animals need 4 to 8 additional days to reach maximum carcass value when compared to an average sized animal. Shorter more compact animals require 4 to 8 less days to reach maximum carcass value when compared to an average animal. Females require an average of 15 fewer days on feed compared to males (steers). Animals that weigh more than the average 700 pounds when they enter the feedlot will need less days on feed (averaging one less day for each three pounds) while the animals weighing less on entry day will need additional days on feed to reach maximum carcass value. Various breed types such as Semintal, Charlois, Gelbveigh and Limousin, commonly referred to as Continental Breeds (referring to the European Continent), will need 8 to 12 additional days on feed when compared to the traditional English Breeds such as Angus, Hereford and Shorthorn. There are numerous combinations of crossbreds of all of the above breeds that can make it very difficult to assign an exacting variation in days for this factor. If the Continental Breeds or Continental crossbreds (Cont.X) are the predominant breed type parentage then an average of 10 additional days on feed are used for this factor when compared to the English Breeds or English crossbreds (Eng.X). Animals taken to a feedlot in there first year will need an average of 10 additional days on feed to reach maximum carcass value when compared to those animals held over into their second year.

It is also important to consider additional variation factors such as the rations to be fed to the animals and the general climate conditions for the region in which the feedlot is located. The majority of the cattle are fed in feedlots during the spring run and fall run which may have different rations. The spring rations can add five days to the total days on feed. Regional climate differences can also effect the number of days on feed needed to reach maximum carcass value. For example, the severity of winter in the northern U.S. states can add 7 to 14 days to the days on feed (due to a reduced daily rate of weight gain per animal) when compared to the central U.S. states. In a similar fashion the heat in the summer months in the southern U.S. states can add 7 to 14 days to the days on feed (due to a reduced daily rate of weight gain per animal) when compared to the central U.S. States. Using the IE I. Fat % Days as a basis, it is then possible to add or subtract all of the above mentioned factors with numerous variations being expressed in days to arrive at a total days on feed needed for the individual animal to reach a potential maximum carcass value. Using the feedlot entry date and adding the total days on feed, the animal is then given a Predicted Day to Maximum Value (PDMV). The PDMV formula for the required days on feed to reach maximum carcass value is as follows: Feedlot Entry Date+[IE I. Fat % Days+(EXE variation)+(sex variation)+(entry weight variation)+(breed type variation)+(age variation)+(ration variation)+(climate variation)]=PDMV date.

The PDMV formula factors that are expressed in days (+ or −) are listed in the following table:

| | | | | PDMV Formula Factors Variations Expressed in Days (+or −) | | | | |
|---|---|---|---|---|---|---|---|---|
| EXE | | SEX WT. | ENTRY TYPE | BREED | AGE | | RATION | CLIMATE |
| Tall-lean | +8 | M  0 | >800# −33 | Cont.X +10 | $1^{st}$ yr. | +10 | Spring +5 | (far)N. U.S. +14 |
| Tall-ave. | +6 | | 775# −25 | (Sem./Char./Gelb. | | | | |
| Tall-wide | +4 | F −15 | 750# −17 | or Limo., etc.) | $2^{nd}$ yr | 0 | Fall    0 | N. U.S. +7 |
| Med-lean | +2 | | 725# −8 | | | | | |
| Med-ave. | 0 | | 700#   0 | Eng.X 0 | | | | C. U.S.    0 |
| Med-wide | −2 | | 675# +8 | (Angus/Hereford | | | | |
| Short-wide | −4 | | 650# +17 | Shorthorn, etc.) | | | | S. U.S. +7 |
| Short-ave. | −6 | | 625# +25 | | | | | |
| Short-lean | −8 | | <600# +33 | | | | | (far)S. U.S. +14 |

Those animals that are genetically unable to attain a profitable carcass value due mainly to very low percentage of I. Fat or possibly small muscle size or poor conformation or any combination of the three are recorded for the feedlot operator as genetic rejects. If any of the factors are not known or not evaluated for an animal or a group of animals then a zero is used in the formula to represent that factor. Those skilled in the art will recognize that because of animal breeds and breeding variations, changes in rations, feeding procedures and animal housing, the formula factors will need to be periodically monitored and evaluated, and adjustments may be required.

An example of two animals that both enter the feedlot on the same day, for example October 10$^{th}$, with different PDMV factors is shown in the following table:

Example: Animal A

| IE 1. Fat Days | Med.-wide | M | 650# | Eng.X | 1$^{st}$ yr. | Spring | N. U.S. | PDMV Date = |
|---|---|---|---|---|---|---|---|---|
| +123 | −2 | +0 | +17 | +0 | +10 | +5 | +7 | March 19 |

Example: Animal B

| IE 1. Fat Days | Tall-wide | M | 725# | Cont.X | 1$^{st}$ yr. | Spring | C. U.S. | PDMV Date = |
|---|---|---|---|---|---|---|---|---|
| +131 | +4 | +0 | −8 | +10 | +10 | +5 | +0 | March 4 |

The evaluations for PDMV are performed on a single occasion for an animal, which usually and preferably is at the time of feedlot entry. Animals with IE/EXE evaluations that indicate that they are genetic rejects can be removed from the feedlot if so desired. The IE/EXE and PDMV date information is recorded electronically on a unique PDMV tag, similar in design to an EID ear tag, that includes exclusive PDMV data information for that particular animal. It is also possible that the IE/EXE and PDMV data information for each animal is recorded and cross-referenced with the I.ID of the animal along with all of the computer animal history file data base information (discussed above) commonly used in a feedlot.

Once the PDMV is assigned to numerous animals, as they leave the feedlot entry process, the computer system sorts and direct the animals into pens with animals having identical PDMVs or a similar range of PDMVs. For example, an entire pen of 300 head of cattle could be sorted so that all of them are predicted to go to market on a particular date, for example March 12$^{th}$ Another entire pen of 300 head could be sorted so that all of them are predicted to go to market on a later date, for example March 13$^{th}$, another on March 14$^{th}$, another on March 15$^{th}$ and so on. It is also possible that an entire pen of 300 head could be sorted so that all of the animals in the pen are in a similar PDMV range, for example, the range may be between PDMV March 11$^{th}$ and PDMV March 15$^{th}$. In this case the cattle would be delivered to the processing plant on March 13$^{th}$ which is the average PDMV date for the five-day range. As feedlots grow larger and those feedlots with a capacity of 10,000 head or more may have five to ten pens feeding 300 head of cattle each that have the same PDMV. The EXE evaluations then becomes more important in that the animals within those five to ten pens can additionally be sorted by size/conformation and gain the advantage discussed earlier with the concept of grouping animals much like the 1$^{st}$ graders, 2$^{nd}$ graders, 3$^{rd}$ grader, etc.

Some absentee owners with cattle in a feedlot may request that the operator put all of their 900 head into three pens of 300 head each so that feed costs can be tracked more accurately for their cattle. The 900 head of cattle can be evaluated with the IE/EXE and given PDMV dates (with PDMV tags or I.ID cross-reference) on an individual basis as they are processed upon entering the feedlot. Using traditional sorting means the cattle are then put into the three feeding pens. The cattle are then sorted out of their main feeding pens individually as they reach their PDMV range allowing the feedlot operator to market them relatively close to or on the date of their PDMV.

These PDMV sorting means will greatly reduce the inconsistencies related to the over-fed/under-fed dilemma. The IE/EXE evaluations will also reduce the losses associated with cattle that are genetically unable to attain profitable carcass value.

FIG. 1 shows the system of the present invention that provides an internal evaluation, preferably in concert with the EXE evaluation, on a single occasion, that being the initial feedlot entry processing, to provide a predicted day to maximum value used for sorting cattle. Referring now to FIG. 1, the animal 102 shown in FIG. 1 is a beef animal, standing in the IE/EXE chute apparatus 104. In this example, the IE/EXE chute apparatus 104 is placed directly behind and in-line with the traditional chute apparatus 106 that has traditionally been used to process the animals as they enter the feedlot as previously described.

The cattle arrive at the feedlot in trucks that are unloaded at the unloading chute 108 into a holding pen 110. From the holding pen 110 the cattle are then moved into a smaller pen 112. These smaller pens 112 have various designs that allow the feedlot operators to move the cattle into a narrow lane 114. The narrow lane 114 can have some additional gates but it is designed to allow the animals to line up in single file to enter the IE/EXE chute 104. After the animal is evaluated in the IE/EXE chute 104, the evaluation data is transferred to the feedlot computer system 116 and the PDMV is calculated. The animal is ready to move forward to the traditional chute 106. When arriving in the traditional chute 106 the animal is processed which includes recording I.ID, weighing, vaccinations, administering health products, etc. as previously described. The IE/EXE and PDMV date are then either combined with the I.ID processed history data or the unique PDMV tag is placed in or on the animal.

After the processing is completed the feedlot computer system 116 uses the PDMV information to sort the animal into a pen of animals with identical or similar range PDMV dates. The animal exits the traditional chute 106 and is directed to the pen by commonly used computerized electronic gates and lane systems (not shown). The animal can be directed to the PDMV assigned pen manually if so desired and the computer PDMV selection/sorting system can be adjusted manually by the operator if so desired. In addition, after receiving a PDMV date, the animal may be directed to feeding pens in a traditional manner with plans to be sorted out individually at the end of the feeding period as was previously described for the absentee owner.

The IE/EXE chute 104 can also be placed in-line so that the cattle pass through the IE/EXE chute 104 after being processed in the traditional chute 106. Whereas the IE/EXE chute 104 apparatus is designed for permanent installation in most feedlots, it can also be portable with a self-contained computer system to travel to smaller feedlots or remote locations. Additionally, the IE/EXE chute 104 can be placed at virtually any location that may or may not be associated with the feedlot entry processing, however, only one IE/EXE evaluation on a single occasion is needed to calculate the PDMV.

Figure 2:
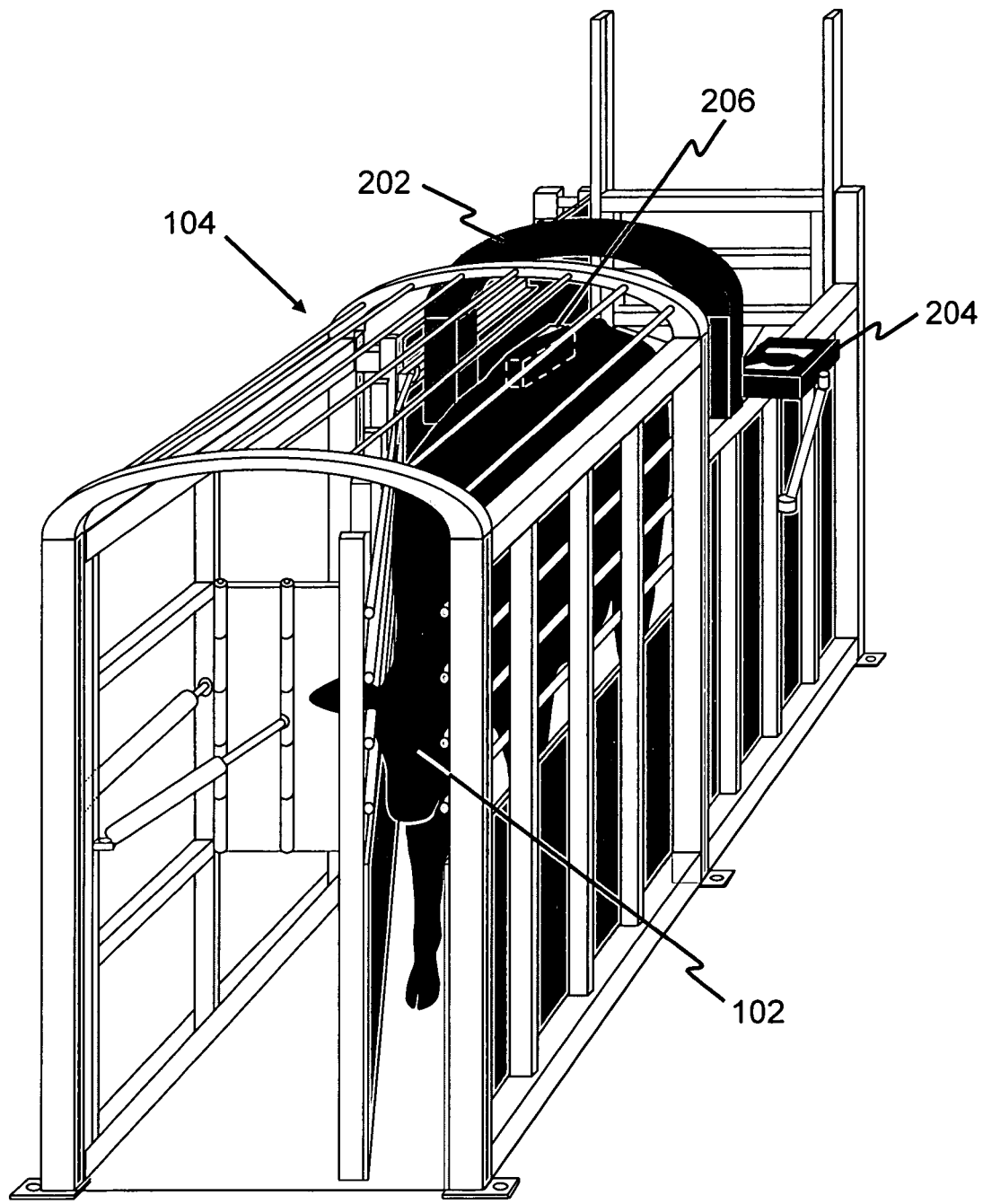
FIG. 2 shows a view of the placement of the IE and EXE evaluation systems within the chute apparatus.

FIG. 2 shows a view of the placement of the IE and EXE evaluation systems within the IE/EXE chute apparatus. Referring now to FIG. 2, the animal 102 is a beef animal, standing in the IE/EXE chute apparatus 104 that is built completely of aluminum, titanium or plastic parts to eliminate interference with the MR evaluation portion of the IE. The restraining IE/EXE chute apparatus 104 does not have the normal headlock used to restrain cattle. This dramatically reduces animal trauma and will be explained further in FIGS. 3A through 3F. In FIG. 2 an IE combination includes, but is not limited to, a C.A.T. scan unit 202 that measures the Size of Ribeye and backfat thickness at the $12^{th}$ and $13^{th}$ rib location. Completing the IE combination is a MR evaluation unit 206 (also commonly referred to as NMR or MRI) that measures the I. Fat % within the round muscle. The MR voxel evaluation unit 206 is difficult to see (shown in white dashes) because the unit evaluates the beef animal 102 at the rear hind quarter round muscle. Although structured light is capable of 3-dimensional surface modeling, the EXE is accomplished with, but is not limited to, a structured light EXE unit 204 using a single linear measurement consisting of the hip height of the animal. All Electric power sources, electric cables, robotic systems guidance control cable, IE evaluation control/data transfer cables and EXE evaluation control/data transfer cables are not shown. All wiring and cables are hidden within the IE/EXE units, protected within conduit or within the structural tubes of chute apparatus 104 and are not exposed to the animals. If so desired, the entire IE/EXE chute 104 can be enclosed except for entry means in the rear and exit means in the front. The EXE unit 204 performs more consistently without ambient light or stray beams of sunlight.

Figure 3C:
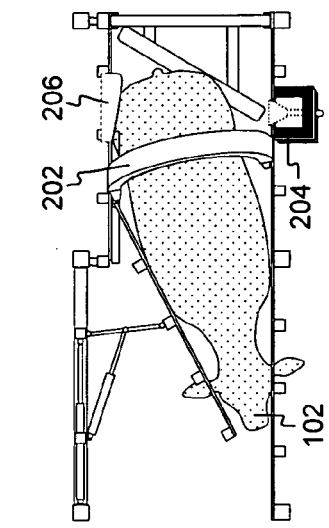
FIGS. 3A-3F shows a series of consecutive scenes with the steps involved in the workings of the IE/EXE chute apparatus as the EXE and IE evaluations occur.
Figure 3B:
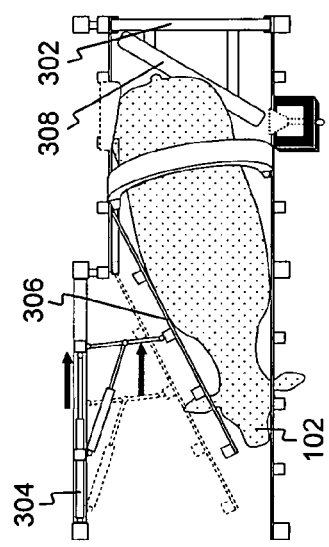
Figure 3A:
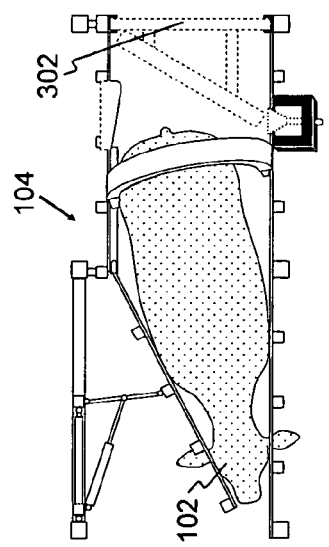
Figure 3F:
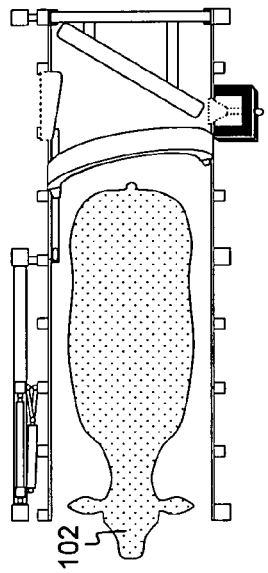
Figure 3E:
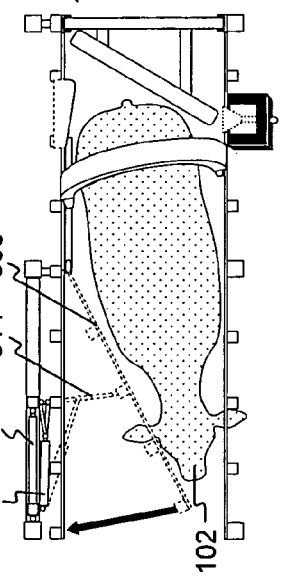
Figure 3D:
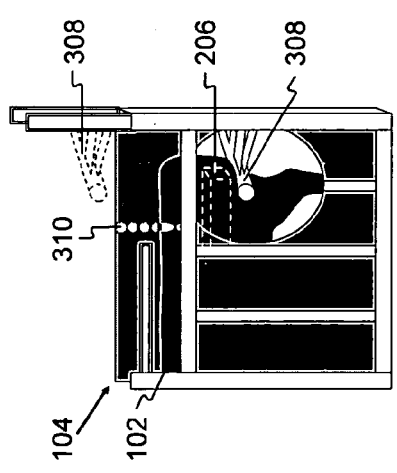

FIGS. 3A through 3F show a series of consecutive scenes of the steps of the IE/EXE units as evaluations occur. Referring now to FIGS. 3A-3F, all of the series of consecutive scenes of the beef animal 102 are shown from above (except FIG. 3D is from the side) inside the IE/EXE chute apparatus 104. As opposed to an extremely high degree of severely induced trauma with headlocks that are normally used in traditional cattle chutes, the IE/EXE chute apparatus 104 uses several natural animal instincts to calmly assist in confining the beef animal 102 for evaluations within the chute. In FIG. 3A the animal 102 enters the chute apparatus 104 from the rear while the chute rear-end gate 302 is in the up or open position (designated by the dashed drawing) above the top level of the chute apparatus 104. It is a natural flight or escape instinct for the beef animal 102 to move forward into the funnel shaped front on the chute apparatus 104. The rear end-gate 302 is then released and slides down the guiding tracks into the closed position behind the animal 102. Within seconds, the beef animal 102 discovers that it can not escape through the narrow funnel shaped front of the chute and instinctively backs up until it runs into the angled bar of the rear-end gate 302. In FIG. 3B the animal 102 has backed up and is continuously pressing instinctively against angled bar 308 that is a part of the rear-end gate 302. The angled bar 308 is positioned on the rear-end gate 302 so that it is approximately one half way between the hock of the animal and the tail head setting. The angled bar 308 is used to calmly assist the beef animal 102 into an immobilized corner and simultaneously the animal will continue to push against the angled bar 308. This continued pressure on the angled bar 308 at that particular location on that particular round muscle (similar to the hamstring in a human) has a slight numbing affect that provides additional immobilization of the beef animal 102. Within a few seconds as the animal settles back, the front chute panel 306 is moved back (front panel shown as moved from original position of dashed lines with black arrows) by piston 304 until a slight pressure is applied onto the animals shoulders thus immobilizing the front end of the beef animal 102. In FIG. 3C the beef animal 102 is confined, immobilized, slightly numbed in the rear end and positioned for each evaluation. The MR voxel evaluation unit 206 portion of the IE is completed within a few seconds followed by the C.A.T. voxel scan unit 202 portion of the IE that passes through several positions and is completed. The EXE unit 204 can be completed in a split second as the animal 102 enters the chute or preferably after it has settled in the confined position as shown in FIG. 3C. In FIG. 3D, referring now to a side view of the rear one half of IE/EXE chute apparatus 104 in which the C.A.T. scan unit 202 and the EXE unit 204 have been removed for easier viewing of the figure. A rear portion of the beef animal 102 is shown in solid black to provided easier viewing within the figure. The MR voxel evaluation unit 206 is shown (in white dashed lines) to see the approximate positioning on the far side round muscle on the rear quarter of the animal 102. The approximate vertical positioning of the angled bar 308 on the round muscle is show on the rear of the beef animal 102 and it is also shown with dashed lines when the entire rear-end gate 302 is in the up or open position. The structured light spots 310 used to determine hip height from the EXE unit 204 (not shown) are projected on the beef animal 102 as well as on the far wall of the chute apparatus 104. In FIG. 3E when the feedlot operator is ready to move the animal 102 forward to the traditional processing chute (not shown), piston 304 is used to return the front chute panel 306 to its original position. Simultaneously, piston 312 is used to pull on the large strap hinge 314 to open the funnel portion (shown with black arrow) of the front chute panel 306. In FIG. 3F the beef animal 102 is then free to move forward to the traditional feedlot-processing chute. Thereafter, the IE/EXE chute apparatus 104 returns to the original position as shown in FIG. 3A and is ready for the next animal.

Figure 4:
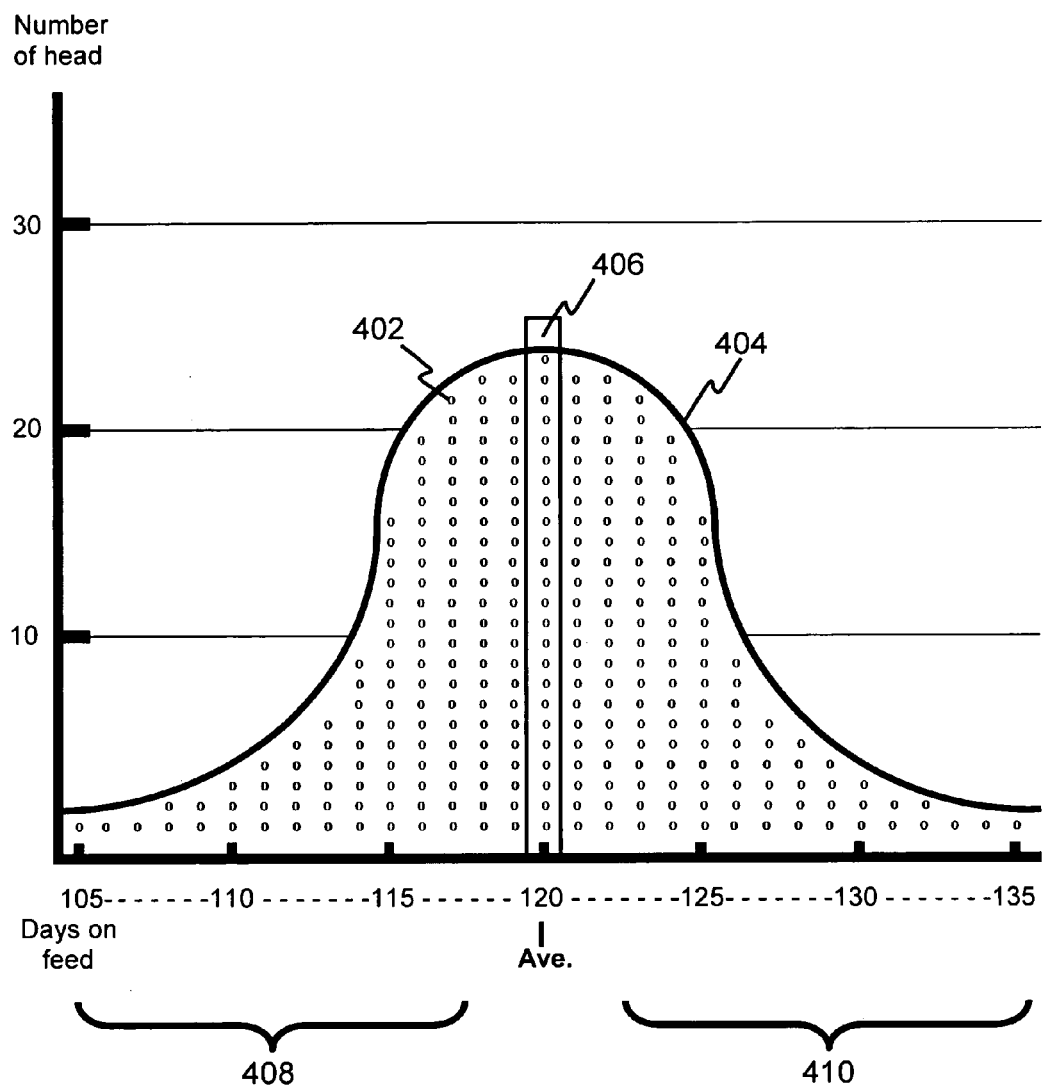
FIG. 4 shows a graph of the marketing day distribution of 300 head of cattle in a feedlot feeding pen using present day or traditional sorting means.

FIG. 4 shows a graph representing the actual marketing day distribution of 300 head of cattle in a feedlot feeding pen using present day or traditional sorting. Referring now to FIG. 4, each of the 300 smaller circles 402 would represent an animal in an average feedlot feeding pen. The vertical axis to the left represents the number of animals in one particular row. The horizontal axis on the bottom represents the number of days on feed. The days on feed are the number of days that an animal is in the feeding pen from the time the animal enters the feedlot until the animal reaches maximum carcass value. One should understand that any particular group of animals in a feedlot pen could vary dramatically. Occasionally, an animal may reach maximum carcass value in 80 to 85 days while another animal may exceed 160 to 165 days. However, this graph and the following graphs (FIGS. 5A-5I, FIG. 7 and FIGS. 8A-8I) represent a conceptual explanation of an average set of cattle in feeding pen(s) of an average feedlot.

This actual marketing day distribution using traditional sorting represents a bell-shaped curve 404. The average days on feed for the entire pen is the 120 day average 406, which is the outlined column, including 24 animals. On or about the 120 day average 406, the entire pen of cattle would be loaded on trucks and transported to the processing plant. In a purest form, it would be ideal to load and transport each animal(s) on the day that they reach maximum carcass value. For example, the animal that has reached maximum carcass value of day 105 could be loaded and transported to the processing plant therein achieving a maximum carcass value on that day. On day 106, one animal could be transported and on day 107 one animal could be transported to the processing plant and on day 108 two animals could be transported and so on, as could all of the animals on each consecutive day as they reach their maximum carcass value. Then nearing the final days on feed, one animal would reach maximum carcass value and could be transported to the processing plant on day 135.

Prior art systems cannot determine precisely which animal is finished on which day, so the entire pen is market on the 120 day average 406. The results are the hidden losses included with the dilemma discussed previously, which are those animals that would be found within the group of over-fed cattle 408 and the group of under-fed cattle 410. The percentage of animals that are genetic rejects and never reach a profitable carcass value would be found randomly throughout the entire pen.

Figure 5A:
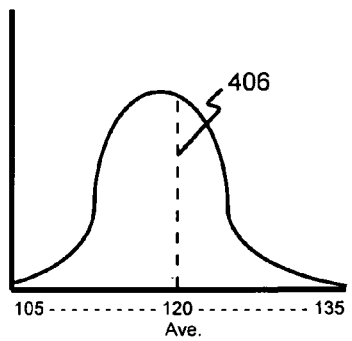
FIGS. 5A-5I shows a series of graphs of the marketing day distribution of 2,700 head of cattle in nine different feeding pens with 300 head in each pen using present day or traditional sorting means.
Figure 5B:
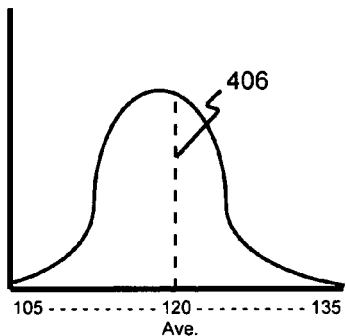
Figure 5C:
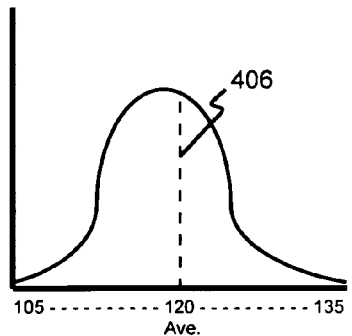
Figure 5D:
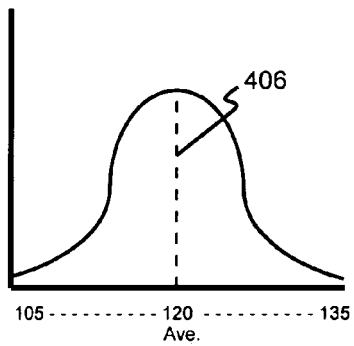
Figure 5E:
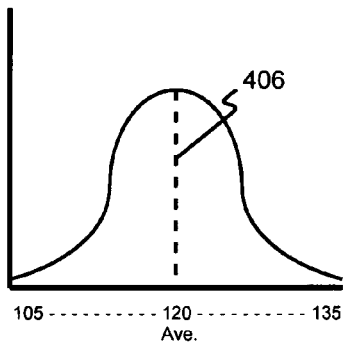
Figure 5F:
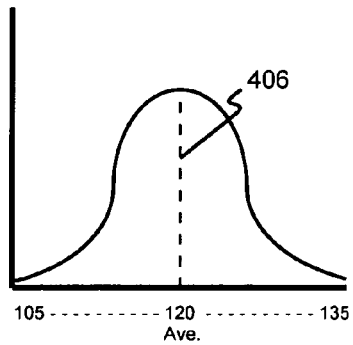
Figure 5G:
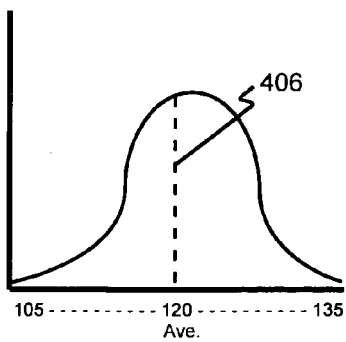
Figure 5H:
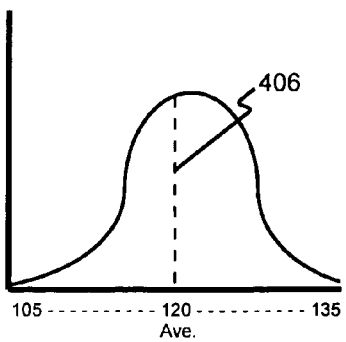
Figure 5I:
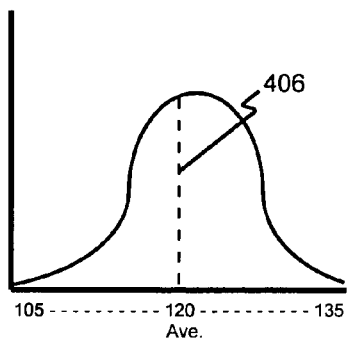

FIGS. 5A through 5I shows a series of nine graphs of the marketing day distribution of 2,700 head of cattle in nine different feeding pens with 300 head in each pen using present day traditional sorting methods. Referring now to FIGS. 5A-5I, each of the nine graphs do not contain sufficient detail to illustrate all of the features shown in FIG. 4 but are intended to represent graphs similar in manner to those shown in FIG. 4. In each graph the vertical axis to the left represents the number of animals in one particular row in the same manner as shown in FIG. 4. The horizontal axis on the bottom of each graph, shown in the same manner as was shown in FIG. 4, represents the number of days on feed or the number of days that an animal is in the feeding pen to reach maximum carcass value. Each graph has a bell-shaped curve that represents the market day distribution of the animals in a similar manner to the bell-shaped curve 404 shown in FIG. 4. Also each graph shows the 120 day average 406 represented in a similar manner as was shown in FIG. 4. FIG. 5A, FIG. 5B, and FIG. 5C represent three graphs of heavier animals that have been sorted into pens with 300 head in each pen. Although not scientific, those skilled in the art would recognize that these pens of cattle might be finished as a group several days before the 120 day average 406. FIG. 5D, FIG. 5E, and FIG. 5F represent three graphs of medium weight animals that have been sorted into pens with 300 head in each pen. Although not scientific, those skilled in the art would recognize that these pens of cattle might be finished as a group very close to the 120 day average 406. FIG. 5G, FIG. 5H, and FIG. 5I represent three graphs of lighter animals that have been sorted into pens with 300 head in each pen. Although not scientific, those skilled in the art would recognize that these pens of cattle might be finished several days after the 120 day average 406. The point of this series of graphs is to easily show that even with the best present day or traditional sorting methods, the bell-shaped marketing day distribution remains within each pen.

Figure 6:
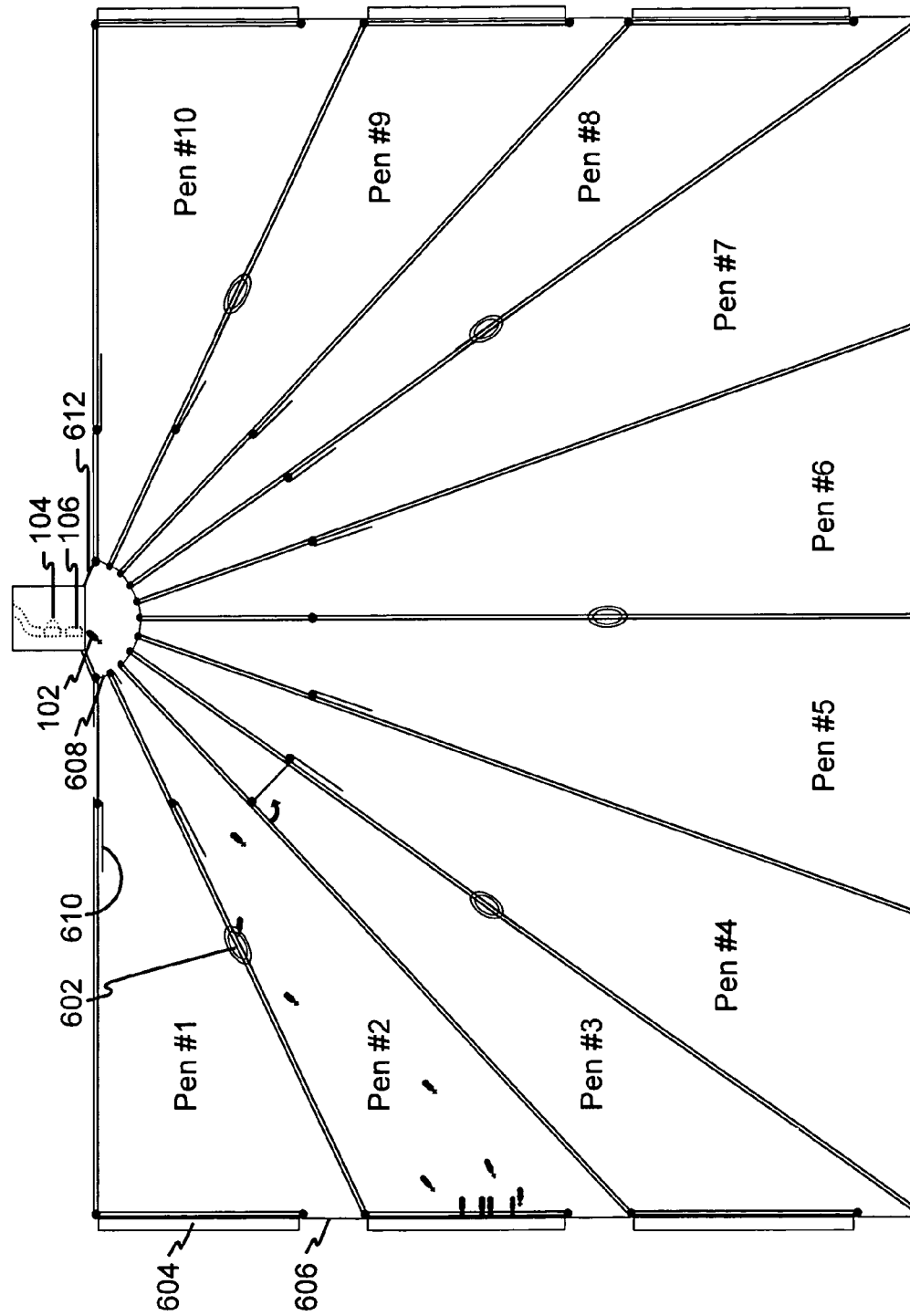
FIG. 6 shows a view of sorting pens used to sort cattle into various groups by their Predicted Days to Maximum Value (or PDMV range) as they leave the chute following their initial entry day processing.

FIG. 6 shows a view of sorting pens used to sort cattle into various groups by their PDMV or PDMV range as they leave the chute following their initial entry day processing. Referring now to FIG. 6, each of the 10 sorting pens as viewed from above have a water source 602, fence-line feedbunk 604, a sorting pen exit gate 606, a sorting pen solid entry door 608, and a restraining gate 610 similar to those shown in Pen #1. There could be more or less than 10 sorting pens depending on the total capacity of the feedlot and the desired needs of the feedlot operator. Each individual sorting pen would have a capacity that would be equal to the feedlot's largest feeding pens. For example, if a feedlot had feeding pens that hold 300 head of cattle during the feeding process, then the sorting pens would have a capacity of 300 head. Each individual sorting pen is assigned a date by the feedlot operator that corresponds to the PDMV or PDMV range of dates. For example, Pen #1 would correspond to a PDMV range of March $2^{nd}$-$4^{th}$, Pen #2 would correspond to a later PDMV range of March $5^{th}$-$7^{th}$, Pen #3 on March $8^{th}$-$10^{th}$, and so on.

During the initial entry day processing, similar to drawings shown in FIG. 1, the animal 102 passes from the IE/EXE chute apparatus 104 to the traditional chute apparatus 106 and receives a PDMV date that is combined with an I.ID. In this example, the animal 102 has been assigned a PDMV for March $7^{th}$ which corresponds to Pen #2. When the animal 102 is ready to be released from the traditional chute apparatus 106, the computer system 116 (not shown) directs the sorting pen solid entry door 608 to open for Pen #2 while all other sorting pen entry doors remain closed. As the animal 102 leaves the traditional chute 106, all other sorting pen entry doors appear to be a solid wall. The animal can only see one opening (entry door 608 opening for Pen #2) and other animals beyond the opening. Two natural instincts, to escape danger and to return to the herd, cause the animal to enter the opening through entry door 608 into Pen #2. After passing through the entry door 608 into Pen #2, the entry door is then closed and the computer system 116 maintains a record by I.ID of the inventory of animals in each sorting pen. As additional animals are processed the sorting is repeated with each individual animal being sorted into the sorting pen that corresponds to their PDMV. If the IE/EXE evaluation determines that an animal is a genetic reject then the animal can be removed through the side gate 612 and not sorted into the sorting pens if the feedlot operator so desires.

Some individual sorting pens may fill to the feedlot operators desired capacity in a single day. Other sorting pens may take several weeks to complete the sorting process and fill to capacity. The time needed for filling any particular sorting pen will depend on the volume of animals entering the feedlot on a daily basis and the variation of the animal's PDMV(s). In either case, the animals have access to a water source 602 and the feedlot operators can begin feeding their rations as so desired for each individual sorting pen. When the computer recorded inventory shows a particular sorting pen to be at full capacity the feedlot operator can then have the animals moved (usually manually) from the sorting pen through the exit gate 606 to the desired traditional feeding pen where they will remain until finished. For example, when the computer system 116 would show Pen #2 at the desired full capacity with 300 head, the feedlot operator would then have the cattle moved out of the sorting Pen #2 through exit gate 606 into an alley way (not shown) where they are then moved to the entry gate of their traditional feeding pen. Thereafter, Pen #2 would be assigned a new PDMV date which would correspond to the next PDMV date in the series of continued PDMV dates. During this moving process, the Pen #2 restraining gate 610 could be closed (as shown in Pen #3) allowing the sorting process to continue. Once all of the animals have been moved and the Pen #2 exit gate 606 has been closed, then the restraining gate 610 would be reopened allowing the newly sorted PDMV animals access to feed and water as the sorting process is repeated to fill the sorting Pen #2 to capacity.

All of the sorting pens are continually filled with animals by their PDMV date(s) and then the animals are moved to traditional feeding pen. Thereafter, the sorting pens are assigned a new PDMV date or range of dates and the sorting process continues until the feedlot reaches full capacity. At any time the feedlot operators can change any portion of the system to fit any particular need. For example, if a feedlot consists mostly of feeding pens with a capacity of 300 head but also has several feeding pens holding 200 head then the sorting pen inventories can be adjusted accordingly. If the feedlot has a very large capacity then cattle can be sorted initially by their PDMV and then secondly by their EXE conformation. Most importantly, this sorting means allows feedlot operators to sort large volumes of cattle into individualized feeding pens of like-kind according to their predicted day to maximum carcass value.

Figure 7:
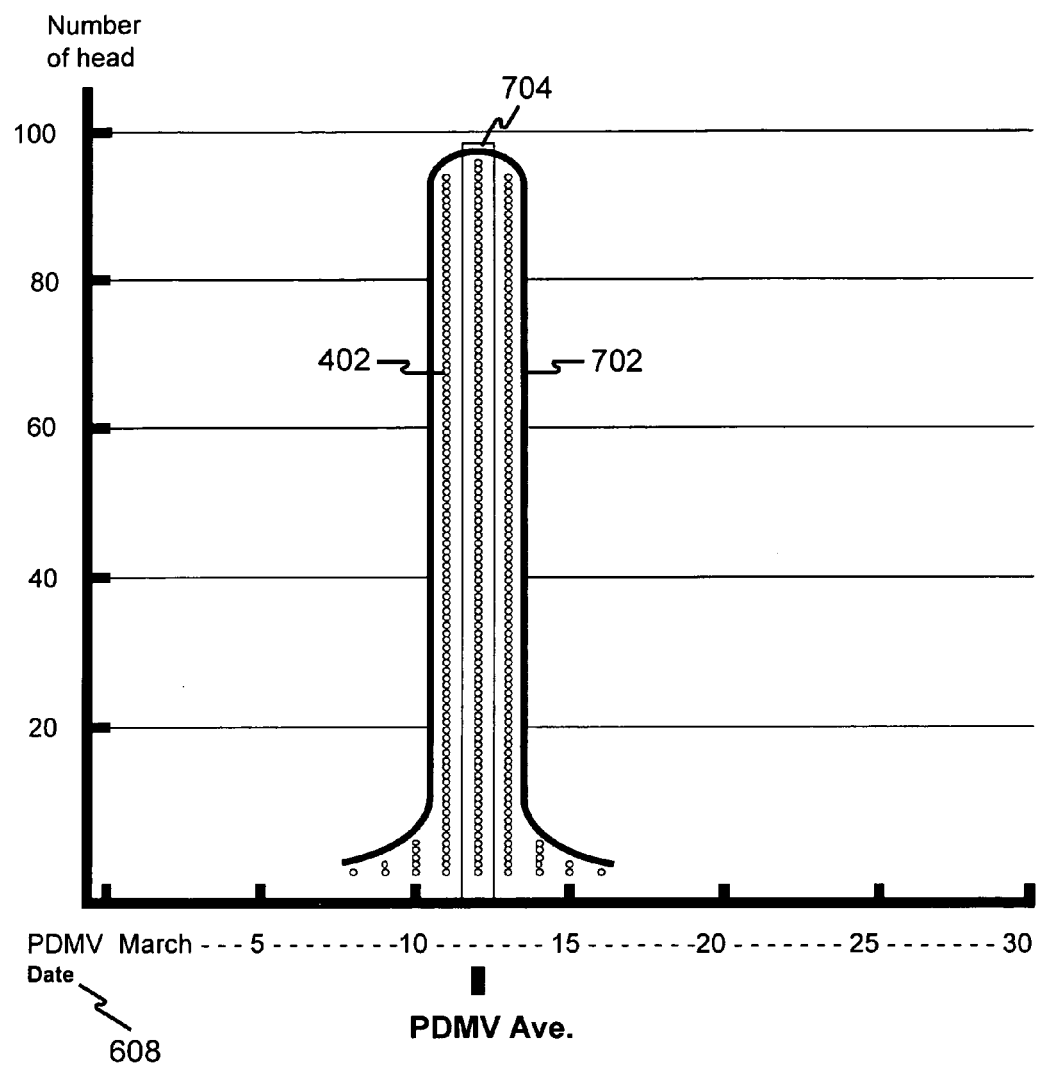
FIG. 7 shows a graph of the marketing day distribution of 300 head of cattle in a feeding pen that have received IE/EXE evaluations in which all PDMV are within a three day range and the cattle have been sorted into this pen by their PDMV.

FIG. 7 show a graph of the marketing day distribution of 300 head of cattle in a feedlot feeding pen that have received IE/EXE evaluations and calculate PDMV dates in which all PDMV dates are within a three day range and the cattle have been sorted into this pen by their PDMV. For FIG. 7 and all of the following figures with references to PDMV sorted cattle/pens, it is assumed that the genetic rejects determined by the IE/EXE evaluations have been eliminated from the feeding pens, graphs, or example thereof. Referring now to FIG. 7, each of the 300 smaller circles 402 would represent an animal in a feedlot feeding pen that has been sorted using the PDMV date that was calculated from the IE/EXE evaluation. The PDMV range is March $11^{th}$, $12^{th}$, and $13^{th}$. Again, the vertical axis to the left represents the number of animals in one particular row. The horizontal axis on the bottom represents the PDMV dates 608. In this example, all 300 animals represent a skewed bell-shaped curve 702. The average PDMV date for the entire pen is the March $12^{th}$ 704 which is the outlined column including 96 animals.

Given the sorting of cattle by their PDMV date in FIG. 7, the entire pen is loaded on trucks that transport them to the processing plant on March $12^{th}$ 704. Nearly every animal in the pen is delivered to the processing plant within a day or two of their predicted maximum carcass value. It is well known that when working with animals, it isn't a perfect science and a few animals will fall outside the three-day PDMV range. However, the over-fed/under-fed/genetic dilemma is dramatically reduced.

Figures 8A, 8B, 8C:
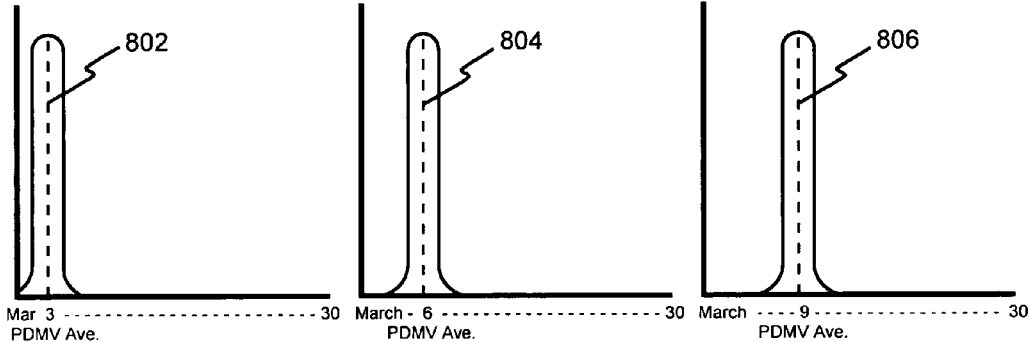
FIGS. 8A-8I shows a series of graphs of the marketing day distribution of 2,700 head of cattle in nine different feeding pens with 300 head in each pen wherein all have received IE/EXE evaluations in which all PDMV are within a three day range for each of the nine different pens and the cattle have been sorted into these pen by their PDMV.
Figures 8D, 8E, 8F:
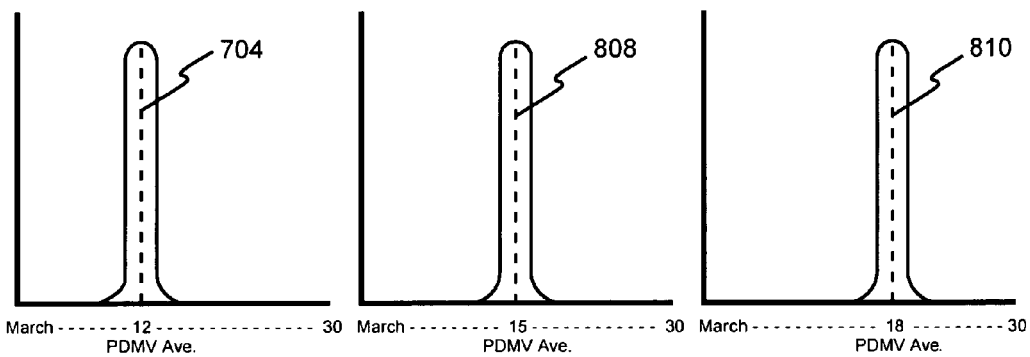
Figures 8G, 8H, 8I:
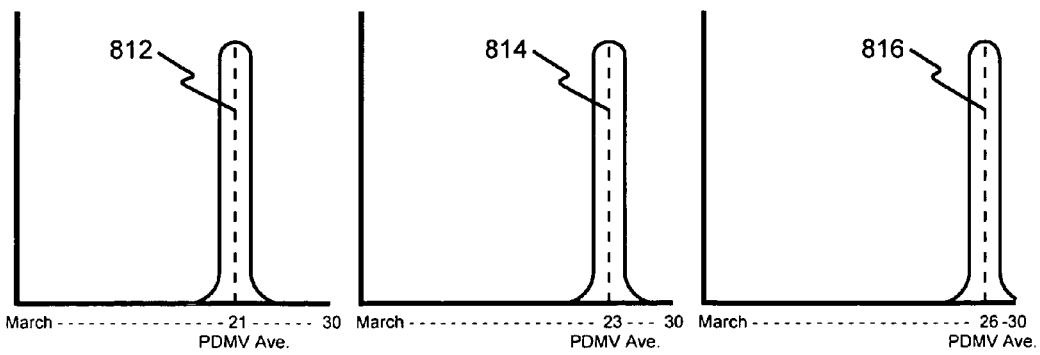

FIGS. 8A through 8I shows a series of nine graphs of the marketing day distribution of 2,700 head of cattle in nine different feeding pens with 300 head in each pen. All animals have received IE/EXE evaluations in which all PDMV dates are within a three-day range for each of the nine different pens and the cattle have been sorted into these pens by their PDMV date 608. Referring now to FIGS. 8A-8I, each of the nine graphs do not contain sufficient detail to illustrate all of the features shown in FIG. 7 but are intended to represent graphs similar in manner to those shown in FIG. 7. In each graph the vertical axis to the left represents the number of animals in one particular row in a similar manner as shown in FIG. 7. The horizontal axis on the bottom of each graph, in a similar manner as was shown in FIG. 7, represents the PDMV 608 or the date that each animal is predicted to reach maximum carcass value. Each graph has a skewed bell-shaped curve that represents the PDMV date of the animals in a similar manner as the skewed bell-shaped curve 702 was shown in FIG. 7. Also each graph shows a different PDMV date that corresponds to the average PDMV date for the 300 head represented in that pen. Referring now to FIG. 8A, this graph represents a pen of 300 head sorted into a three day PDMV range with the average PDMV of March $3^{rd}$ 802. Referring now to FIG. 8B, this graph represents a pen of 300 head sorted into a three day PDMV range with the average PDMV of March $6^{th}$ 804. Referring now to FIG. 8C, this graph represents a pen of 300 head sorted into a three day PDMV range with the average PDMV of March $9^{th}$ 806. Referring now to FIG. 8D, this graph represents a pen of 300 head as shown in FIG. 7, sorted into a three day PDMV range with the average PDMV of March $12^{th}$ 704. Referring now to FIG. 8E, this graph represents a pen of 300 head sorted into a three day PDMV range with the average PDMV of March $15^{th}$ 808. Referring now to FIG. 8F, this graph represents a pen of 300 head sorted into a three day PDMV range with the average PDMV of March $18^{th}$ 810. Referring now to FIG. 8G, this graph represents a pen of 300 head sorted into a three day PDMV range with the average PDMV of March $21^{st}$ 812. Referring now to FIG. 8H, this graph represents a pen of 300 head sorted into a three day PDMV range with the average PDMV of March $23^{rd}$ 814. Referring now to FIG. 8I, this graph represents a pen of 300 head sorted into a three day PDMV range with the average PDMV of March $26^{th}$ 816. Given the sorting of 2,700 head of cattle into nine feeding pens by their PDMV dates, the 300 head are loaded into trucks on each respective PDMV date and transported to the processing plant according to their date. Again, the over-fed/under-fed/genetic dilemma is dramatically reduced.

With annual trends showing feedlots continually increasing the number of head per feedlot, the present invention has additional advantages. Larger feedlots that have a capacity over 5,000 head (some now exceeding 100,000 head capacity), will have numerous pens with the same Predicted Day to Maximum Value date. For example, a feedlot with a capacity of 12,000 head may have six to eight pens that have the same PDMV date. The EXE portion of the IE/EXE evaluations will allow feedlot operators to sort those cattle that have the same PDMV dates into pens by similar body size, thus gaining the $1^{st}$ grader, $2^{nd}$ grader, $3^{rd}$ grader advantage that was discussed earlier.

Figure 9:
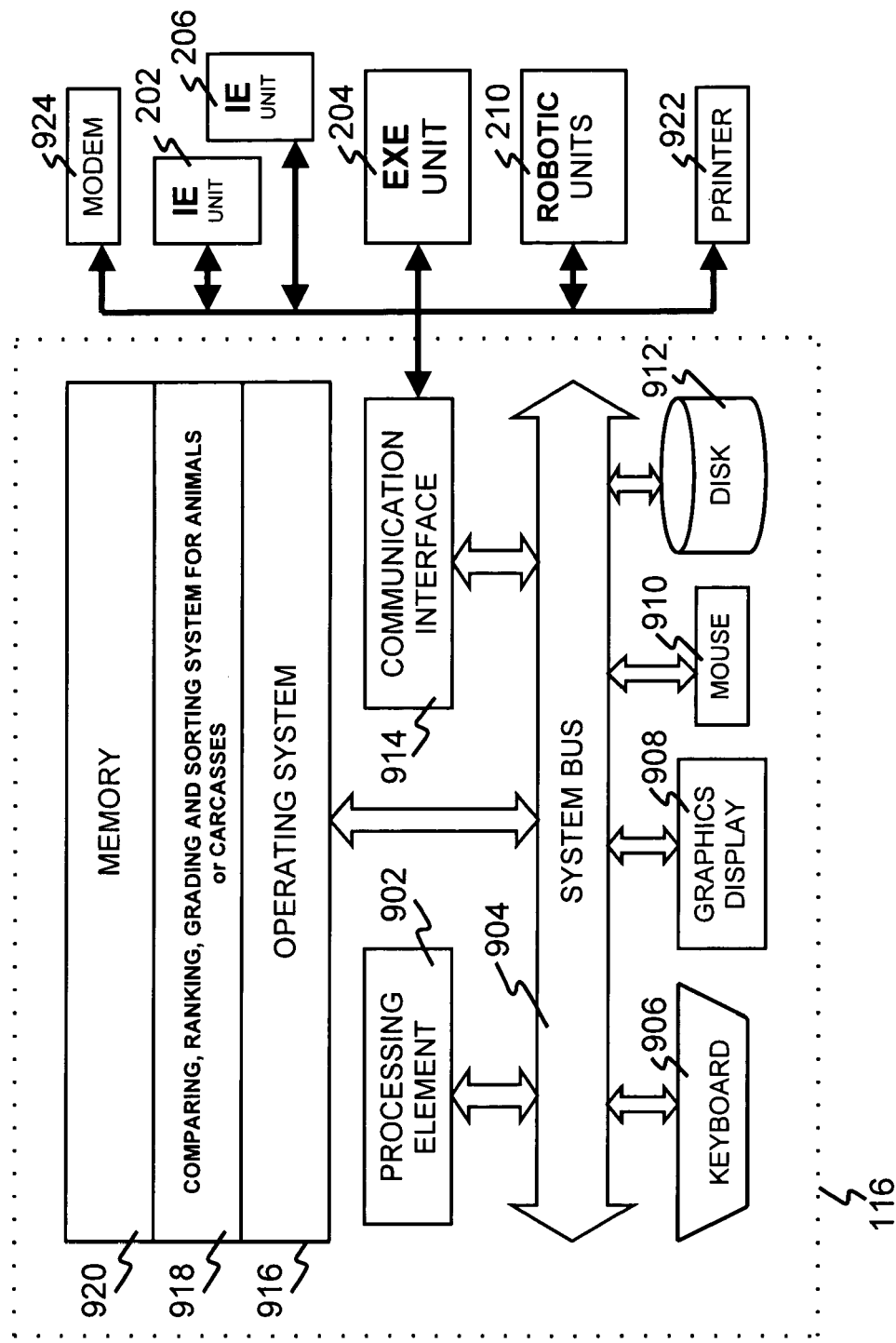
FIG. 9 shows a block diagram of the computer system of the present invention.

FIG. 9 shows a block diagram of a computer system including the IE, EXE and robotic units of the present invention. Referring now to FIG. 9, the computer system 116 contains a processing element 902. The processing element 902 communicates to the other elements of the computer system 116 over a system bus 904. A keyboard 906, IE units 202 and 206, a EXE unit 204, and various robotic units 210 allow input to the computer system 116. A mouse 910 provides input for locating specific points on or within the animal as displayed on graphics display 908, which also provides a display of any other information to be viewed by the user of the computer system 116. A printer 922 allows for output to paper to be viewed by a user of the computer system 116. A disk 912 stores the software and data used by the system of the present invention, as well as an operating system and other user data of the computer system 116.

A memory 920 contains an operating system 916, and as application program 918, comparing, ranking, grading and sorting system for animals. Those skilled in the art will recognize that the operating system 916 could be one of many different operating systems, including many windows-type operating systems, and that many application programs could be performing in a multi-tasking operation system.

Figure 10:
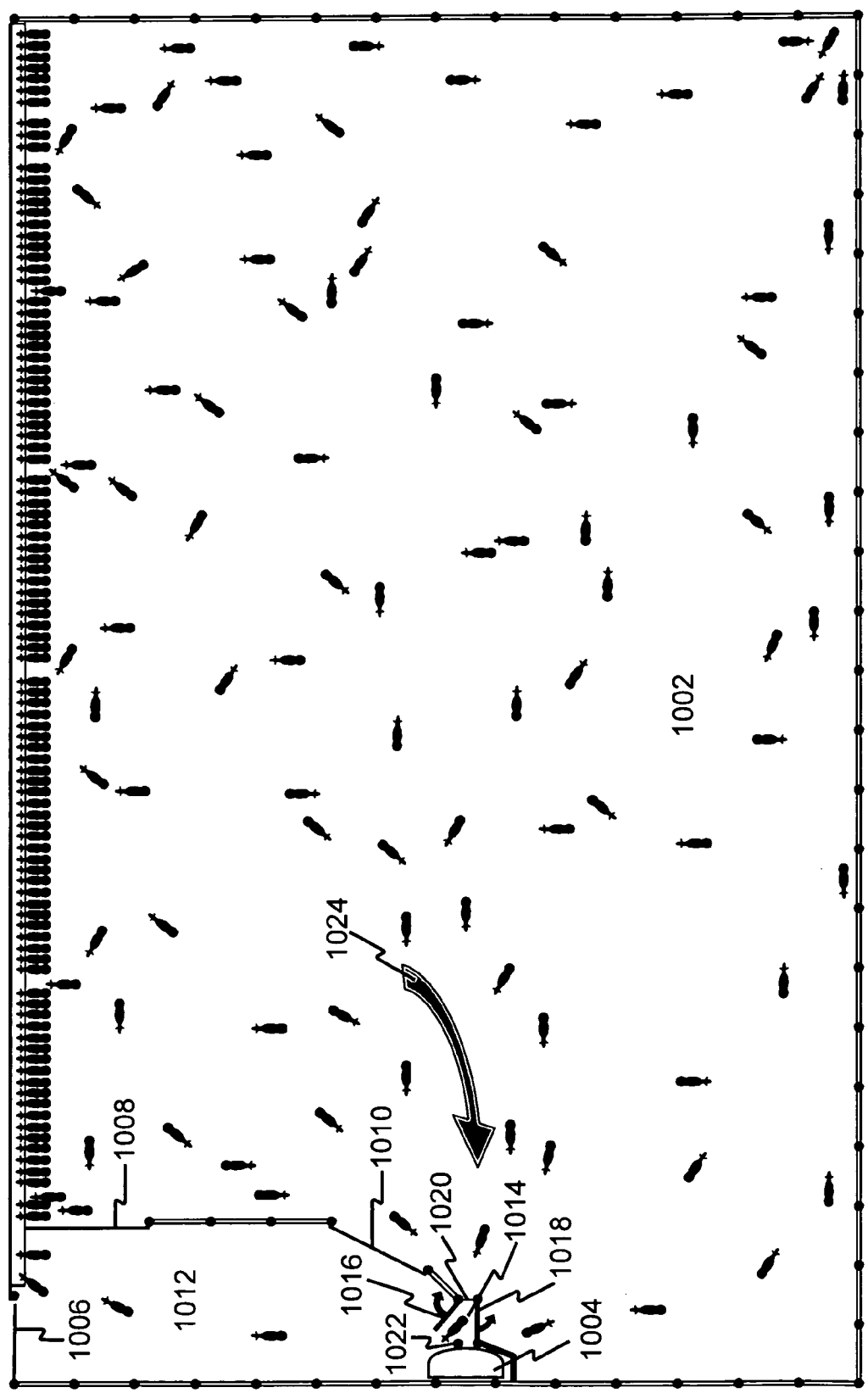
FIG. 10 shows a drawing of cattle (200 head or less) in a feeding pen as desired animal path movement is developed so that individual animals can be sorted by their PDMV on the proper day.

FIG. 10 shows a drawing of cattle in a feeding pen as desired animal path movement is developed so that individual animals can be sorted on the proper day by their PDMV after completing the feeding period. FIG. 10 describes a sorting means of individual animals by PDMV date after the animals have completed the feeding process, if for example, an absentee owner (discussed previously) or any owner for any reason has requested that their cattle are placed in pens in the traditional sorting means. Referring now to FIG. 10, the feedlot feeding pen 1002, shows a view from above, of a pen of approximately 200 animal or less that are all represented by small black symbols. Each of the animals received their PDMV dates during the feedlot entry processing. The PDMV date of each animal is electronically coded on the unique PDMV tag. Alternatively, the PDMV date can be cross-referenced with or include within the I.ID. The various animals within the feeding pen 1002 would each have PDMV dates that would range in a similar fashion to the bell-shaped curve in FIG. 4. The outline of the pen 1002 represents fencing. The portion of the pen 1002 that has numerous animals standing side by side represent the feeding bunks that are built into a containing fence. A water source is supplied in a water tank 1004. The pen gate 1006 allows the animals to enter the pen 1002 after being processes at feedlot entry time. The pen gate 1006 is also used as an exit gate for the animals after the feeding period is complete at which time they are moved down alleys (not shown) to loading chutes to be loaded onto trucks for transport to the processing plant. Gate 1008 and gate 1010 are open when the animals originally enter the pen 1002 and are closed just prior to transferring the first individual animal into the PDMV sorting pen 1012. The initial transferring of animals into the PDMV sorting pen 1012 will usually begin after the animals have been in the feeding pen approximately 90 days. By closing the gate 1008 and gate 1010 the PDMV sorting pen 1012 is created. Gate 1008 is adjustable and can move to the right to allow additional bunk feeding space if 10 or more animals are to be sorted into the PDMV sorting pen 1012. The PDMV sorting chute 1014 has a robotic sidewall gate 1016 and a robotic sidewall gate 1018. The PDMV sorting chute 1014 also has an entry robotic turnstile 1020 that allows an individual animal, in search of the water tank 1004, to enter the PDMV chute 1014 only after a previous animal has exited the PDMV chute 1014 leaving the chute empty. The PDMV chute 1014 also has an antenna apparatus 1022 in the front corner. This antenna apparatus 1022 electronically reads the unique PDMV tag or I.ID of each animal as it approaches to drink. The individual PDMV data is then transferred to the feedlot computer system 116. The gray arrow shows the desired animal path movement (DAPM) 1024.

Animals are creatures of habit and have a tremendous tendency to follow patterns using sight, hearing, smell and taste as key indicators of their habits. Any dramatic change in these indicators can be express by animal stress and can cause some animals to "shut down" for hours or days. If for example, you change water or the water tank, some animal will refuse to drink for as much as a day or two. If you drastically change feed rations or feeding bunks, some animals will "go off feed" or dramatically reduce their feed intake for a day or two resulting in weight loss. Creating DAPM with very slight changes over a period of months can prevent "shut down" within the group of cattle being fed.

When the cattle initially enter the feeding pen 1002, the internal pen gates 1008 and 1010 are in the open position. The robotic sidewall gates 1016 and 1018 are also in the open position and the turnstile 1020 swings freely so that the cattle have complete access to the water tank 1004 and the area that will become the PDMV sorting pen 1012. In this example the water source and water tank 1004 are used to entice the animals to develop the DAPM 1024 which includes a PDMV sorting chute 1014 with an adjoining PDMV sorting pen 1012. It is also possible to develop the DAPM 1024 around the feeding bunks, salt or mineral licks, individuals feeding chutes or any other means that would entice the animals to move through an area on a periodic basis that would include a PDMV sorting chute 1014 with an adjoining PDMV sorting pen 1012.

To begin the development of the DAPM 1024, the robotic sidewall gate 1016 in closed at the end of the first month. At the end of the second month, the robotic sidewall gate 1018 is closed and the robotic turnstile 1020 becomes operational by allowing an animal to enter only after the previous animal has exited. After drinking at the water tank 1004 animals are only released through robotic sidewall gate 1018 to return to the feeding pen 1002. At the end of the third month any animals in the PDMV sorting pen 1012 area are moved to the main feeding pen 1002 and the internal gates 1008 and 1010 are closed creating the empty PDMV sorting pen 1012. Shortly thereafter, the antenna apparatus 1022 data via the computer system 116 begins to record the presence of the animal, records the date/time when each animal drinks, and after allowing sufficient time to drink, directs the robotic sidewall gate 1018 to open if the animal is to remain in the feeding pen 1002. If at any time within a 24 hour period, the animal's individual PDMV date indicates that the animal is to be marketed that day, then the computer system 116 directs the robotic sidewall gate 1016 to open so that the animal enters the PDMV sorting pen 1012. The feedlot operators can then remove the cattle from the PDMV sorting pen 1012 to the alleys (not shown) and on to trucks for transport to the processing plant. All reports concerning PDMV cattle can be provided daily as well as listings for future PDMV marketing dates. The feedlot operator can review the list of animals passing through the PDMV sorting chute 1014 at any time.

The animals that are sorted into the PDMV sorting pen 1012 will act far different than those sorted into an exit way path, an exit way pen or a holding pen as discribed in prior art. In the PDMV sorting pen 1012, the cattle will experience virtually no stress because the sights and smells are the same around the pen and fences. The smells of the water tank and feed bunk are the same. The water will taste the same and the ration will be exactly the same within the PDMV sorting pen 1012.

Figure 11:
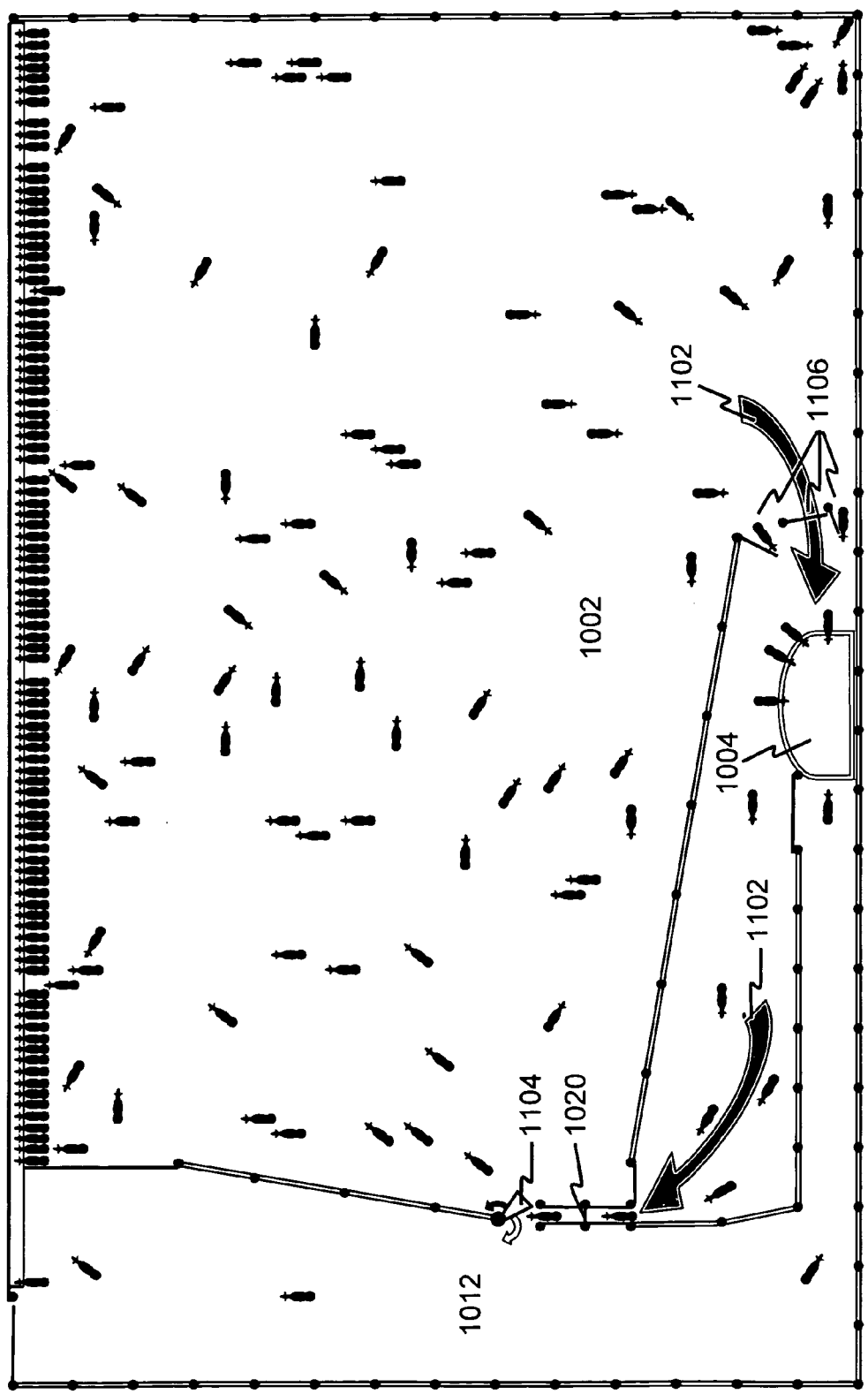
FIG. 11 shows a drawing of cattle (200 head or more) in a feeding pen as they are sorted by their PDMV on the proper day.

FIG. 11 shows a drawing of more than 200 cattle in a feeding pen as they are sorted by their PDMV dates on the proper day. Referring now to FIG. 11, all of the concepts that are explained in FIG. 10 remain the same in FIG. 11. The only difference is that in feedlot feeding pens that are larger and hold more than 200 head, the animals need to have access to water in greater numbers. There are at least one but preferably more turnstiles 1106 allowing more animals to enter the water tank area for drinking. The sorting mechanism 1104 is still directed from the feedlot computer 116 and uses robotics to shift either left or right allowing animals to return to the feeding pen 1002 or sorted to the PDMV sorting pen 1012. The desired animal path movements shown with gray arrows 1102 is still created on a gradual basis over several months by closing internal gates between the feeding pen 1002 and the PDMV sorting pen 1012. Again, in this example, the water source and water tank 1004 are used to entice the animals to develop the DAPM 1024 which includes a PDMV sorting chute 1014 with an adjoining PDMV sorting pen 1012. It is also possible to develop the DAPM 1024 around the feeding bunks, salt or mineral licks, individuals feeding chutes or any other means that would entice the animals to move through an area on a periodic basis that would include a PDMV sorting chute 1014 with an adjoining PDMV sorting pen 1012.

Referring now to the cow-calf segment of the beef industry, young calves 4 to 6 months old, weanlings (after being weaned from the cow), yearling or virtually any age can be evaluated internally as previously discussed. Again, the internal evaluation usually includes but is not limited to, measuring the surface area of a cross-section of the ribeye muscle, percent of I.Fat within each ribeye cross-section and the thickness of the backfat along with, if necessary, the thickness of hide in that area. The surface area of a cross-section of the ribeye of a calf may only be two to three square inches.

It is important to note that any animal, including a beef animal, is born with a certain percentage of I. Fat cells along with a certain percentage of muscle cells within any particular muscle bundle. This does not change throughout the normal life of an animal. Excluding the normal growth process, as the animal gains body weight the subcutaneous fat that is commonly referred to as backfat increases in thickness and the I. Fat cells within the muscle bundles individually increase in size but new I. Fat cells are not created. This is true the longissimus dorsi or ribeye muscle between the $12^{th}$ and $13^{th}$ rid area. The only exception is when an animal approaches obesity. At that time, the brain (by way of nature's rules) says there is an excess of food here and signals to add additional I. Fat cells. This brain signaling for additional I. Fat happens the last few days of feeding in a feedlot. The exact increase in the number of or percentage increase of I. Fat cells has not been measured to date. In the past it was necessary to kill the animal to measure the I. Fat accurately. Obviously, with the animal dead, they could not measure what the I. Fat had been in previous weeks nor could they measure the I. Fat in future weeks to come.

The internal evaluations can again, preferably be used in concert with the EXE evaluations, however, it is possible for the internal evaluations will provided adequate information for sorting, comparing and predicting future maximum values. IE/EXE evaluations of young stock provide numerous advantages to cow-calf operators. Included among but not limited to the advantages are IE/EXE evaluations to compare, rank and sort individuals within the herd, across breeds, within the U.S. beef herd population and with competing international beef herds.

For example, the cow-calf herd operator is able to use internal evaluations to measure his young male calf crop (considering age adjustments) for ribeye muscle size, percentage of I. Fat, and backfat thickness. The external age adjusted EXE evaluation for growth patterns, stature and body shape would be combined with the internal evaluations with the data compiled in a computer system. This would allow the operator to rank and compare his male calf crop within his herd and sort the elite males to be used for future herd sires or sell them at a premium value. He will also be able to use the data with genetic formulas to compare the current sires and dams in his herd. His IE/EXE data will allow him to compare and rank his calves with the national beef herd. His young male calf crop will be rated as future predicted Prime, predicted Choice or predicted Select animals or any similar rating system. Predicted grade and yield rankings would add value to the higher predicted animal on sale day.

The cow-calf operator could also use IE/EXE evaluation to compare, rank and sort the cows in his herd along with his female calf crop. Being able to select the top IE/EXE ranking females for herd replacement and culling the lower ranked females would add tremendous genetic improvement to his herd. Genetic improvement through sire selection adds the most rapid herd improvement because the bulls have more offspring than any female in the herd. The cow-calf operator can use IE/EXE evaluations for comparing, ranking and selecting future herd sires.

All of the above comparing, ranking and sorting applications can be easily formulated to predicted maximum values (PMV) by simply using the IE and EXE evaluations as a base and adjusting the data with age adjustment factors. Additionally, as the calves grow older, many factors may be used which included but are not limited to those factors used in the feedlot segment such as sex, weight, breed type, age, ration and climate. The IE/EXE chute apparatus and evaluation process as described in FIG. 1, FIG. 2 and FIG. 3. are similar for the cow-calf segment needs except the actual chute itself is smaller when applicable to accommodate the younger animals. Whereas the IE/EXE chute apparatus is designed for permanent installation in the feedlot segment, it can also be portable with a self-contained computer system to travel to remote cow-calf operations and smaller feedlots.

The computer systems, programming, and software resulting in the IE/EXE evaluation (s) can be used independently at any location or in conjunction with existing industry computer systems and the IE/EXE evaluation data, predicted timeframe data, PDMV data, PMV data, predicted maximum value data or any other data deem necessary will be compiled from any and all locations to a main frame computer. This allows for quality control, translation, interpretation and any interaction of any data between any segment of the beef industry.

While the general inventive concepts and systems have been described in connection with illustrative and presently preferred embodiments thereof, it is intended that other embodiments of these general concepts and systems be included with the scope of the claims of this application and any patent issued therefrom. It is contemplated that use of the present system will enable an enhanced knowledge with respect to the correlation between internal and external measurable characteristics and traits, predictable maximum values, and timeframes needed to reach those maximum values based on past maximum performances of carcasses or animal and their offspring. While the general concepts and systems of the invention have been illustrated and described by reference to a particular kind of animal and carcasses, i.e., beef animal, it is to be understood and it is contemplated that the general concepts may be applied to other kinds of animals or animal carcasses, such as swine, buffalo, dairy cattle, horses, poultry, exotic meat producing animal, etc. for any worthwhile purpose.

What is claimed is:

1. A method for determining a number of days to maximum value to continue feeding an animal prior to processing the animal in order to obtain a desired maximum value for the animal, said method comprising the steps of:
   (a) acquiring a non-invasive internal evaluation of at least one multi-dimensional voxel of a predetermined internal location within the animal;
   (b) measuring a percentage of intramuscular fat within said non-invasive evaluation acquired in step (a);
   (c) determining the number of days to maximum value from the percentage of intramuscular fat measured in step (b); and
   (d) processing the animal after the animal has been fed for substantially the number of days to maximum value determined in step (c).

2. The method of claim 1 wherein step (c) further comprises the steps of:
   (c1) creating an individualized identification device containing the number days; and
   (c2) attaching the individualized identification device to the animal.

3. The method of claim 1 wherein step (c) further comprises the steps of:
   (c1) creating an individualized identification device containing the number days; and (c2) inserting the individualized identification device into the animal.

4. The method of claim 1 wherein step (c) further comprises the steps of:
(c1) determining a feeding pen for the animal from the number of days to maximum value; and
(c2) directing the animal to the feeding pen determined in step (c1).

5. The method of claim 1 wherein step (b) further comprises the following step (b1):
(b1) measuring a thickness of a hide of the animal.

6. A system for determining a number of days to maximum value to continue feeding an animal prior to processing the animal in order to obtain a desired maximum value for the animal, said system comprising:
an examination device for acquiring a non-invasive evaluation of at least one multi-dimensional voxel from a predetermined internal location within the animal to create an internal evaluation;
a computer system that reads the internal evaluation from the examination device, measures a percentage of intramuscular fat within the internal evaluation, and determines the number of days to maximum value from the percentage of intramuscular fat; and
a feeding pen for holding and feeding the animal for substantially the number of days to maximum value.

7. The system of claim 6 further comprising:
an identification writer device attached to said computer system for creating an individualized identification device containing the number days to maximum value, wherein the individualized identification device is attached to the animal after being created.

8. The system of claim 6 further comprising:
an identification writer device attached to said computer system for creating an individualized identification device containing the number days to maximum value, wherein the individualized identification device is inserted into the animal after being created.

9. The system of claim 6 wherein the computer system measures a thickness of a hide of the animal.

10. A method for determining a number of days to continue feeding each of a plurality of animals prior to processing the animals in order to obtain a desired maximum value for each of the animals, said method comprising the steps of:
(a) acquiring a non-invasive internal evaluation of at least one multi-dimensional voxel of a predetermined internal location within each animal;
(b) measuring a percentage of intramuscular fat within said evaluation acquired in step (a);
(c) determining the number of days to maximum value from the percentage of intramuscular fat measured in step (b);
(d) storing, for each animal, the number of days to maximum value determined in step (c);
(e) directing all animals to a common pen; and
(f) selecting an animal as the animal passes a predetermined location within the common pen, retrieving the number of days to maximum value for the selected animal, and when the selected animal has been fed for the number of days to maximum value, directing the selected animal to a sorting pen.

11. A method for comparing the rankings of animals for selection, said method comprising the steps of:
(a) acquiring a non-invasive internal evaluation of at least one multi-dimensional voxel of a predetermined internal location within each animal;
(b) measuring a percentage of intramuscular fat within said evaluation acquired in step (a);
(c) determining a rank for each animal from the percentage of intramuscular fat measured in step (b); and
(d) selecting at least one animal with a predetermined rank for retention.

12. The method of claim 11 wherein the at least one animal selected in step (d) has a predetermined rank for herd replacement.

13. The method of claim 11 wherein the at least one animal selected in step (d) has a predetermined rank for herd sire replacement.

14. The method of claim 11 wherein the at least one animal selected in step (d) has a predetermined rank for retention as superior marketable breeding stock.

15. The method of claim 11 wherein the at least one animal selected in step (d) has a predetermined rank for retention as marketable meat producing stock.

16. The method of claim 11 wherein the predetermined rank is selected using a predetermined genetic formula.

17. A system for determining a number of days to maximum value to continue feeding an animal prior to processing the animal in order to obtain a desired maximum value for the animal, said system comprising:
a first examination device for acquiring a non-invasive evaluation from a predetermined internal location within the animal to create a first internal evaluation;
a second examination device for acquiring a non-invasive evaluation from a predetermined internal location within the animal to create a second internal evaluation;
a computer system that reads the first internal evaluation from the first examination device and the second internal evaluation from the second examination device, measures a percentage of intramuscular fat within the first internal evaluation, measures a muscle size of a muscle within the second internal evaluation, and determines the number of days to maximum value from the percentage of intramuscular fat and the muscle size; and
a feeding pen for holding and feeding the animal for substantially the number of days to maximum value.

* * * * *